United States Patent
Hardt

(10) Patent No.: US 10,298,594 B2
(45) Date of Patent: *May 21, 2019

(54) GRADUATED AUTHENTICATION IN AN IDENTITY MANAGEMENT SYSTEM

(71) Applicant: Callahan Cellular L.L.C., Wilmington, DE (US)

(72) Inventor: Dick C. Hardt, Vancouver (CA)

(73) Assignee: Callahan Cellular L.L.C., Wilimington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,008

(22) Filed: Jun. 2, 2016

(65) Prior Publication Data

US 2017/0006042 A1    Jan. 5, 2017

Related U.S. Application Data

(63) Continuation of application No. 14/622,722, filed on Feb. 13, 2015, now Pat. No. 9,398,020, which is a
(Continued)

(51) Int. Cl.
| | | |
|---|---|---|
| *H04L 29/06* | (2006.01) | |
| *G06F 17/30* | (2006.01) | |
| *G06F 15/16* | (2006.01) | |
| *G06F 7/04* | (2006.01) | |
| *G06F 21/60* | (2013.01) | |

(52) U.S. Cl.
CPC .......... *H04L 63/105* (2013.01); *G06F 21/606* (2013.01); *H04L 63/08* (2013.01); *H04L 63/1416* (2013.01); *H04L 63/1466* (2013.01); *H04L 63/0428* (2013.01); *H04L 63/0815* (2013.01)

(58) Field of Classification Search
CPC ..... H04L 63/105; H04L 21/606; H04L 63/08; H04L 63/1416; H04L 63/1466; H04L 63/0428; H04L 63/0815; G06F 21/606
USPC .............................................................. 726/4
See application file for complete search history.

(56) References Cited

U.S. PATENT DOCUMENTS

| | | | |
|---|---|---|---|
| 3,837,501 A | 9/1974 | Pielkenrood | |
| 4,067,813 A | 1/1978 | Pielkenrood | |

(Continued)

FOREIGN PATENT DOCUMENTS

| | | | |
|---|---|---|---|
| AU | 2003240323 A1 | 12/2003 | |
| CA | 2222580 A1 | 7/1998 | |

(Continued)

OTHER PUBLICATIONS

Marlena Erdos; Shibboleth-Architecture Draft v05; MACE; 2002; p. 1-44.*

(Continued)

*Primary Examiner* — Monjur Rahim
(74) *Attorney, Agent, or Firm* — Perkins Coie LLP

(57) ABSTRACT

A method and system for graduated security in an identity management system utilize differing levels of time sensitivity, channel security and authentication security to provide a multi-dimensional approach to providing the right fit for differing identity requests. The differing levels of security can be selected by user preference, membersite request or homesite policy.

20 Claims, 8 Drawing Sheets

Related U.S. Application Data continuation of application No. 14/015,813, filed on Aug. 30, 2013, now Pat. No. 8,959,652, which is a continuation of application No. 11/039,885, filed on Jan. 24, 2005, now Pat. No. 8,527,752.

(60) Provisional application No. 60/605,150, filed on Aug. 30, 2004, provisional application No. 60/579,890, filed on Jun. 16, 2004.

(56) References Cited

U.S. PATENT DOCUMENTS

| | | |
|---|---|---|
| 4,437,988 A | 3/1984 | James |
| 4,713,753 A | 12/1987 | Boebert et al. |
| 4,759,063 A | 7/1988 | Chaum |
| 4,759,064 A | 7/1988 | Chaum |
| 4,780,821 A | 10/1988 | Crossley |
| 4,799,156 A | 1/1989 | Shavit et al. |
| 4,914,698 A | 4/1990 | Chaum |
| 4,949,380 A | 8/1990 | Chaum |
| 4,991,210 A | 2/1991 | Chaum |
| 5,487,826 A | 1/1996 | Back et al. |
| 5,644,723 A | 7/1997 | Deaton et al. |
| 5,677,955 A | 10/1997 | Doggett et al. |
| 5,737,701 A | 4/1998 | Rosenthal et al. |
| 5,774,551 A | 6/1998 | Wu et al. |
| 5,781,629 A | 7/1998 | Haber et al. |
| 5,794,207 A | 8/1998 | Walker et al. |
| 5,794,259 A | 8/1998 | Kikinis |
| 5,815,665 A | 9/1998 | Teper et al. |
| 5,855,007 A | 12/1998 | Jovioic et al. |
| 5,872,850 A | 2/1999 | Klein et al. |
| 5,875,296 A | 2/1999 | Shi et al. |
| 5,903,721 A | 5/1999 | Sixtus |
| 5,911,141 A | 6/1999 | Kelley et al. |
| 5,930,479 A | 7/1999 | Hall |
| 5,953,710 A | 9/1999 | Fleming |
| 5,983,208 A | 11/1999 | Haller et al. |
| 5,995,965 A | 11/1999 | Experton |
| 6,005,939 A | 12/1999 | Fortenberry et al. |
| 6,009,410 A | 12/1999 | LeMole et al. |
| 6,012,044 A | 1/2000 | Maggioncalda et al. |
| 6,026,166 A | 2/2000 | LeBourgeois |
| 6,029,141 A | 2/2000 | Bezos et al. |
| 6,052,710 A | 4/2000 | Saliba et al. |
| 6,061,790 A | 5/2000 | Bodnar |
| 6,073,106 A | 6/2000 | Rozen et al. |
| 6,073,241 A | 6/2000 | Rosenberg et al. |
| 6,092,196 A | 7/2000 | Reiche |
| 6,125,352 A | 9/2000 | Franklin et al. |
| 6,131,096 A | 10/2000 | Ng et al. |
| 6,154,768 A | 11/2000 | Chen et al. |
| 6,192,380 B1 | 2/2001 | Light et al. |
| 6,199,079 B1 | 3/2001 | Gupta et al. |
| 6,208,659 B1 | 3/2001 | Govindarajan et al. |
| 6,233,608 B1 | 5/2001 | Laursen et al. |
| 6,243,688 B1 | 6/2001 | Kalina |
| 6,247,029 B1 | 6/2001 | Kelley et al. |
| 6,253,203 B1 | 6/2001 | O'Flaherty et al. |
| 6,266,692 B1 | 7/2001 | Greenstein |
| 6,285,983 B1 | 9/2001 | Jenkins |
| 6,289,333 B1 | 9/2001 | Jawahar et al. |
| 6,298,347 B1 | 10/2001 | Wesley |
| 6,308,203 B1 | 10/2001 | Itabashi et al. |
| 6,321,339 B1 | 11/2001 | French et al. |
| 6,327,578 B1 | 12/2001 | Linehan |
| 6,353,852 B1 | 3/2002 | Nestoriak, III et al. |
| 6,356,905 B1 | 3/2002 | Gershman et al. |
| 6,381,597 B1 | 4/2002 | Lin |
| 6,385,596 B1 | 5/2002 | Wiser et al. |
| 6,401,085 B1 | 6/2002 | Gershman et al. |
| 6,421,768 B1 | 7/2002 | Purpura |
| 6,442,696 B1 * | 8/2002 | Wray ............... G06F 21/31 713/176 |
| 6,491,217 B2 | 12/2002 | Catan |
| 6,496,855 B1 | 12/2002 | Hunt et al. |
| 6,571,279 B1 | 5/2003 | Herz et al. |
| 6,571,285 B1 | 5/2003 | Groath et al. |
| 6,584,448 B1 | 6/2003 | Laor |
| 6,605,224 B2 | 8/2003 | Aymong |
| 6,606,643 B1 | 8/2003 | Emens et al. |
| 6,609,198 B1 | 8/2003 | Wood et al. |
| 6,629,081 B1 | 9/2003 | Cornelius et al. |
| 6,651,090 B1 | 11/2003 | Itabashi et al. |
| 6,665,704 B1 | 12/2003 | Singh |
| 6,668,322 B1 | 12/2003 | Wood et al. |
| 6,708,205 B2 | 3/2004 | Sheldon et al. |
| 6,714,916 B1 | 3/2004 | Robertson et al. |
| 6,725,050 B1 | 4/2004 | Cook |
| 6,751,735 B1 | 6/2004 | Schell et al. |
| 6,845,370 B2 | 1/2005 | Burkey et al. |
| 6,865,426 B1 | 3/2005 | Schneck et al. |
| 6,879,965 B2 | 4/2005 | Fung et al. |
| 6,907,401 B1 | 6/2005 | Vittal et al. |
| 6,944,677 B1 | 9/2005 | Zhao |
| 6,957,334 B1 | 10/2005 | Goldstein et al. |
| 7,016,875 B1 | 3/2006 | Steele et al. |
| 7,016,877 B1 | 3/2006 | Steele et al. |
| 7,054,906 B2 | 5/2006 | Levosky |
| 7,076,558 B1 | 7/2006 | Dunn |
| 7,089,208 B1 | 8/2006 | Levchin et al. |
| 7,100,195 B1 | 8/2006 | Underwood |
| 7,133,846 B1 | 11/2006 | Ginter et al. |
| 7,197,539 B1 | 3/2007 | Cooley |
| 7,216,292 B1 | 5/2007 | Snapper et al. |
| 7,257,581 B1 | 8/2007 | Steele et al. |
| 7,257,843 B2 * | 8/2007 | Fujita ............... G06F 21/52 707/999.009 |
| 7,260,724 B1 * | 8/2007 | Dickinson ............... H04L 63/08 713/182 |
| 7,277,546 B2 * | 10/2007 | Dhawan ............... H04K 1/04 375/E7.04 |
| 7,289,971 B1 | 10/2007 | O'Neil et al. |
| 7,333,942 B1 | 2/2008 | Cowles |
| 7,343,351 B1 | 3/2008 | Bishop et al. |
| 7,380,271 B2 | 5/2008 | Moran et al. |
| 7,391,865 B2 * | 6/2008 | Orsini ............... G06F 21/31 380/1 |
| 7,454,623 B2 | 11/2008 | Hardt |
| 7,467,141 B1 | 12/2008 | Steele |
| 7,487,130 B2 | 2/2009 | Steele |
| 7,496,751 B2 | 2/2009 | de Jong et al. |
| 7,546,349 B1 | 6/2009 | Cooley |
| 7,610,391 B2 | 10/2009 | Dunn |
| 7,694,335 B1 * | 4/2010 | Turner ............... H04L 63/1441 708/250 |
| 7,783,741 B2 | 8/2010 | Hardt |
| 7,793,095 B2 | 9/2010 | Hardt |
| 7,827,115 B2 | 11/2010 | Weller |
| 7,836,490 B2 * | 11/2010 | Smith ............... H04L 63/083 726/13 |
| 7,941,669 B2 * | 5/2011 | Foley ............... H04L 63/083 713/182 |
| 8,117,649 B2 | 2/2012 | Hardt |
| 8,260,806 B2 | 9/2012 | Steele |
| 8,296,825 B2 * | 10/2012 | Leone ............... H04L 63/0272 709/221 |
| 8,504,704 B2 | 8/2013 | Hardt |
| 8,527,752 B2 | 9/2013 | Hardt |
| 8,566,248 B1 | 10/2013 | Steele |
| 8,782,405 B2 * | 7/2014 | Okunseinde ............... G06Q 20/382 709/229 |
| 8,959,652 B2 | 2/2015 | Hardt |
| 9,245,266 B2 | 1/2016 | Hardt |
| 9,398,020 B2 | 7/2016 | Hardt |
| 2001/0011250 A1 | 8/2001 | Paltenghe et al. |
| 2001/0018660 A1 | 8/2001 | Sehr |
| 2001/0018675 A1 | 8/2001 | Blaze et al. |
| 2001/0039586 A1 | 11/2001 | Primak et al. |
| 2001/0047276 A1 | 11/2001 | Eisenhart |
| 2002/0002684 A1 | 1/2002 | Fox et al. |
| 2002/0016721 A1 | 2/2002 | Mason et al. |
| 2002/0029201 A1 | 3/2002 | Barzilai et al. |

(56) References Cited

U.S. PATENT DOCUMENTS

| | | |
|---|---|---|
| 2002/0049912 A1 | 4/2002 | Honjo et al. |
| 2002/0062262 A1 | 5/2002 | Vasconi et al. |
| 2002/0078233 A1 | 6/2002 | Biliris et al. |
| 2002/0087641 A1 | 7/2002 | Levosky |
| 2002/0091745 A1 | 7/2002 | Ramamurthy et al. |
| 2002/0091798 A1 | 7/2002 | Joshi et al. |
| 2002/0099671 A1 | 7/2002 | Mastin Crosbieet et al. |
| 2002/0107807 A1 | 8/2002 | Ketonen et al. |
| 2002/0107972 A1 | 8/2002 | Keane |
| 2002/0112083 A1 | 8/2002 | Joshi et al. |
| 2002/0112155 A1 | 8/2002 | Martherus et al. |
| 2002/0112185 A1 | 8/2002 | Hodges |
| 2002/0116642 A1 | 8/2002 | Joshi et al. |
| 2002/0120599 A1 | 8/2002 | Knouse et al. |
| 2002/0138581 A1 | 9/2002 | MacIntosh et al. |
| 2002/0152179 A1 | 10/2002 | Racov |
| 2002/0154157 A1 | 10/2002 | Sherr et al. |
| 2002/0165960 A1 | 11/2002 | Chan |
| 2002/0174369 A1 | 11/2002 | Miyazaki et al. |
| 2002/0178365 A1 | 11/2002 | Yamaguchi |
| 2002/0194138 A1 | 12/2002 | Dominguez et al. |
| 2002/0198818 A1 | 12/2002 | Scott et al. |
| 2002/0199095 A1 | 12/2002 | Bandini et al. |
| 2003/0018587 A1 | 1/2003 | Althoff et al. |
| 2003/0033528 A1 | 2/2003 | Ozog et al. |
| 2003/0074580 A1 | 4/2003 | Knouse et al. |
| 2003/0079123 A1 | 4/2003 | Mas Ribes |
| 2003/0110397 A1 | 6/2003 | Supramaniam et al. |
| 2003/0130960 A1 | 7/2003 | Fraser et al. |
| 2003/0131232 A1 | 7/2003 | Fraser et al. |
| 2003/0135732 A1 | 7/2003 | Vaha-Sipila |
| 2003/0149781 A1* | 8/2003 | Yared ............... G06F 21/41 709/229 |
| 2003/0154306 A1 | 8/2003 | Perry |
| 2003/0158960 A1 | 8/2003 | Engberg |
| 2003/0163733 A1 | 8/2003 | Barriga-Caceres |
| 2003/0204725 A1 | 10/2003 | Itoi et al. |
| 2003/0208684 A1 | 11/2003 | Camacho et al. |
| 2003/0225841 A1 | 12/2003 | Song et al. |
| 2003/0229783 A1 | 12/2003 | Hardt |
| 2004/0008666 A1 | 1/2004 | Hardjono |
| 2004/0010697 A1 | 1/2004 | White |
| 2004/0049677 A1 | 3/2004 | Lee et al. |
| 2004/0103324 A1 | 5/2004 | Band |
| 2004/0128558 A1 | 7/2004 | Barrett |
| 2004/0143750 A1 | 7/2004 | Kulack et al. |
| 2004/0162786 A1 | 8/2004 | Cross et al. |
| 2004/0177110 A1 | 9/2004 | Rounthwaite et al. |
| 2004/0181665 A1 | 9/2004 | Houser |
| 2004/0205243 A1 | 10/2004 | Hurvig et al. |
| 2004/0225883 A1 | 11/2004 | Weller et al. |
| 2004/0243823 A1 | 12/2004 | Moyer et al. |
| 2004/0255117 A1 | 12/2004 | Paater et al. |
| 2005/0005110 A1 | 1/2005 | Kim et al. |
| 2005/0010653 A1 | 1/2005 | McCanne |
| 2005/0015340 A1 | 1/2005 | Maes |
| 2005/0114453 A1 | 5/2005 | Hardt |
| 2005/0171811 A1 | 8/2005 | Campbell |
| 2005/0210107 A1 | 9/2005 | Mora |
| 2005/0210244 A1 | 9/2005 | Stevens et al. |
| 2005/0283443 A1 | 12/2005 | Hardt |
| 2005/0283614 A1 | 12/2005 | Hardt |
| 2006/0005019 A1 | 1/2006 | Chao |
| 2006/0005020 A1 | 1/2006 | Hardt |
| 2006/0005263 A1 | 1/2006 | Hardt |
| 2006/0031489 A1 | 2/2006 | Marcjan |
| 2006/0106734 A1 | 5/2006 | Hoffman et al. |
| 2006/0179003 A1 | 8/2006 | Steele et al. |
| 2006/0200425 A1 | 9/2006 | Steele et al. |
| 2006/0229944 A1 | 10/2006 | Walker et al. |
| 2007/0130460 A1 | 6/2007 | Pfitzmann et al. |
| 2007/0143860 A1 | 6/2007 | Hardt |
| 2007/0277034 A1 | 11/2007 | LiVecchi |
| 2007/0282733 A1 | 12/2007 | May |
| 2008/0010298 A1 | 1/2008 | Steele et al. |
| 2009/0125429 A1 | 5/2009 | Takayama |
| 2009/0157531 A1 | 6/2009 | Bui |
| 2009/0210293 A1 | 8/2009 | Steele et al. |
| 2010/0306830 A1 | 12/2010 | Hardt |
| 2015/0180879 A1 | 6/2015 | Hardt |
| 2016/0140582 A1 | 5/2016 | Steele et al. |

FOREIGN PATENT DOCUMENTS

| | | |
|---|---|---|
| CA | 2245293 A1 | 9/1999 |
| CA | 2431311 A1 | 9/2003 |
| CA | 2458257 A1 | 9/2003 |
| CA | 2447121 A1 | 1/2004 |
| CA | 2468351 A1 | 8/2004 |
| CA | 2468585 A1 | 8/2004 |
| CA | 2493897 A1 | 4/2005 |
| CA | 2494225 A1 | 4/2005 |
| CN | 1289974 A | 4/2001 |
| EP | 1089516 A2 | 4/2001 |
| EP | 1089518 A2 | 4/2001 |
| EP | 1223527 A2 | 7/2002 |
| EP | 1316016 A2 | 6/2003 |
| EP | 1316028 A1 | 6/2003 |
| EP | 1316041 A1 | 6/2003 |
| EP | 1388986 A1 | 2/2004 |
| EP | 1520217 A2 | 4/2005 |
| EP | 1766840 A1 | 3/2007 |
| EP | 1766852 A1 | 3/2007 |
| EP | 1766853 A1 | 3/2007 |
| EP | 1766863 A1 | 3/2007 |
| FR | 1098155 A | 7/1955 |
| JP | 11282804 A | 10/1999 |
| JP | 2001186122 A | 7/2001 |
| JP | 2003071960 A | 3/2003 |
| JP | 2003323408 A | 11/2003 |
| JP | 2005529392 T | 9/2005 |
| WO | 0067415 | 11/2000 |
| WO | 0146783 A2 | 6/2001 |
| WO | 0167364 A1 | 9/2001 |
| WO | 0205092 A2 | 1/2002 |
| WO | 0205103 A1 | 1/2002 |
| WO | 0205139 A1 | 1/2002 |
| WO | 0205185 A1 | 1/2002 |
| WO | 0205487 A1 | 1/2002 |
| WO | 2002001462 | 1/2002 |
| WO | 03046748 | 6/2003 |
| WO | 03098898 | 11/2003 |
| WO | 03104947 | 12/2003 |
| WO | 2005048544 | 5/2005 |
| WO | 2005125077 | 12/2005 |
| WO | 2005125086 | 12/2005 |
| WO | 2005125087 | 12/2005 |
| WO | 2005125096 | 12/2005 |
| ZM | 200500060 | 3/2006 |

OTHER PUBLICATIONS

United States Patent and Trademark Office, Final Office Action, U.S. Appl. No. 11/327,176, dated Apr. 6, 2017, 12 pages.

"724 Solutions-Products-Financial Services," www.724.com, Sep. 25, 2001, 1 page.

"724 Solutions-Products-m-Commerce," www.724.com, Sep. 25, 2001, pp. 1-4.

"724 Solutions-Products-Wireless Internet Platform," www.724.com, Sep. 25, 2001, pp. 1-3.

Affiliate Application, "How do Gator, Price Helper and Offer Companion Work?", www.gator.com, Sep. 6, 2001, 1 page.

"Choicepoint Unveils New Web-based Pre-Employment Screening Service," Business Wire pp. 1287, May 17, 1999.

"Co-Brand Partner Opportunities," www.yodlee.com, Sep. 6, 2001, pp. 1-2.

"Content Partner Opportunities," www.yodlee.com, Sep. 6, 2001, 1 page.

"Create Relationships," www.digitalme.com, Sep. 6, 2001, pp. 1-2.

"Digitaline™ Fact Sheet (www.digitalme.com)" www.digitalme.com, Sep. 6, 2001, pp. 1-3.

(56) References Cited

OTHER PUBLICATIONS

"Ezlogin.Com Introduces Liveclips, Enabling Net Users to Clip Content From Anywhere on the Web and Paste It on a Custom Page," Java Industry Connection, Mar. 8, 2000, pp. 1-2.
"FAQ", www.digitalme.com, Sep. 6, 2001, pp. 1-2.
"Free Password Manager—Store passwords—Desktop or Online," www.passwordsafe.com, Oct. 10, 2001, 1 page.
"Implementing Mobile Passport," Copyright 1999-2001 Microsoft Corporation, Oct. 26, 2001, pp. 1-5.
"Learn More," www.digitalme.com, Sep. 6, 2001, pp. 1-2.
"Liberty Architecture Overview," Version 1.1, Internet Citation, Jan. 15, 2003, pp. 1-44.
"LinkUall.com—About Us—LinkUall Technology" www.linkuall.com, Copyright 1999-2000 Sinpag Inc., 1 page.
"LinkUall.com—Products—Calendars and Address books," www.linkuall.com, Oct. 10, 2001, pp. 1-2.
"Make it Convenient," www.digitalme.com, Sep. 6, 2001, pp. 1-3.
"Microsoft Passport Member Services, What is Passport," www.passport.com, Aug. 3, 2001, pp. 1-12.
"Microsoft Passport: A single name, password and Wallet for the web," WWW.passport.com, Aug. 3, 2001, pp. 1-2.
"Microsoft Passport: Streamlining Commerce and Communication on the Web," www.passport.com, Oct. 11, 1999, pp. 1-3.
"Online Businesses Use Microsoft Passport Single Sign-In and Wallet Services to Provide Customers with Secure and Convenient Shopping," www.microsoft.com, May 17, 2000, pp. 1-2.
"Security Overview," www.yodlee.com, Sep. 6, 2001, pp. 1-2.
"Spamgourmet: FAQ," by Spamgourmet.com, Web Archive dated Aug. 29, 2003, 3 pages.
"Spam-me-not Documentations," Web Archive Dated Oct. 11, 2003, 5 pages.
"Spoofed/Forged Email," 2002 Carnegie Mellon University, pp. 1-7.
"Sweet Enonymity," www.enonymous.com, Sep. 6, 2001, pp. 1-2.
"Take Control," www.digitalme.com, Sep. 6, 2001, pp. 1-2.
"Vision for an Enonymous Infomediary," www.enonymous.com, Sep. 6, 2001, pp. 1-3.
"Yodlee2Go: Web-enabled Phones", www.yodlee.com, Sep. 6, 2001, I page.
"Yodlee for Mobile: Simplify Your Life on the Road with Yodlee2Go," www.yodlee.com, Sep. 6, 2001, I page.
"Yodlee for Web: One-Click Access to All Personal Accounts," www.yodlee.com, Sep. 6, 2001, I page.
"Yodlee: e-Personalization Applications," www.yodlee.com, Sep. 6, 2001, 1 page.
"Yodlee: e-Personalization Platform," www.yodlee.com, Sep. 6, 2001, 1 page.
"Yodlee: e-Personalization Solutions," www.yodlee.com, Sep. 6, 2001, 1 page.
"Yodlee2Go: Palm OS Wireless," www.yodlee.com, Sep. 6, 2001, I page.
"Zkey-Corporate," www.zkey.com, Oct. 10, 2001, 1 page.
United States Patent and Trademark Office, Advisory Action before the Filing of an Appeal Brief for U.S. Appl. No. 09/988,811, dated Apr. 20, 2009, 3 pages.
United States Patent and Trademark Office, Advisory Action for U.S. Appl. No. 09/933,567, dated Jul. 21, 2006, 3 pages.
United States Patent and Trademark Office, Advisory Action for U.S. Appl. No. 10/455,438, dated Feb. 19, 2010, 3 pages.
United States Patent and Trademark Office, Advisory Action for U.S. Appl. No. 10/867,768, dated Sep. 17, 2009, 3 pages.
United States Patent and Trademark Office, Advisory Action for U.S. Appl. No. 11/039,885, dated Feb. 24, 2010, 4 pages.
United States Patent and Trademark Office, Advisory Action for U.S. Appl. No. 11/039,886, dated Sep. 17, 2010, 3 pages.
United States Patent and Trademark Office, Advisory Action for U.S. Appl. No. 11/327,176, dated Mar. 25, 2011, 2 pages.
United States Patent and Trademark Office, Advisory Action for U.S. Appl. No. 11/824,358, dated Aug. 24, 2010, 3 pages.
Alan Cohen and Walaika Haskins, "Grab and-Go Web," *PC Magazine*, Oct. 19, 2000, pp. 1-5.
Asaravala, A, "A Question of Identity Passport, Liberty and the Single Sign-On Race," www.newarchitectmag.com, Jan. 31, 2003, pp. 22-24, XP009022582.
Bennett, "NGWS-Microsoft's Dot Net Strategy," PC_Buyer's_Guide.com, Jun. 22, 2000, pp. 1-5.
Chu et al., "Web-Based Single Sign-On Solutions: An SSO Product Matrix," *Computer Security Journal*, CSI Computer Security Institute, XX, vol. 16, No. 1, 2000, pp. 39-49, XP008021056.
Coulouris, "Secure Communication in Non-Uniform Trust Environment," ECOOP Workshop on Distributed Object Security, Jul. 1998, 5 pages.
Erdos et al., "Shibboleth-Architecture DRAFT v05 Online!", May 2, 2002, pp. 5-9, XP002264221.
European Patent Office, Examination Report, European Patent Application 05757655.5, dated Apr. 13, 2012, 6 pages.
United States Patent and Trademark Office, Final Office Action for U.S. Appl. No. 09/933,567, dated Nov. 1, 2007, 13 pages.
United States Patent and Trademark Office, Final Office Action for U.S. Appl. No. 09/933,567, dated May 11, 2006, 9 pages.
United States Patent and Trademark Office, Final Office Action for U.S. Appl. No. 09/988,811, dated Jan. 27, 2010, 8 pages.
United States Patent and Trademark Office, Final Office Action for U.S. Appl. No. 09/988,811, dated Dec. 30, 2010, 10 pages.
United States Patent and Trademark Office, Final Office Action for U.S. Appl. No. 09/988,811, dated Feb. 2, 2009, 9 pages.
United States Patent and Trademark Office, Final Office Action for U.S. Appl. No. 10/455,438, dated Oct. 30, 2008, 14 pages.
United States Patent and Trademark Office, Final Office Action for U.S. Appl. No. 10/455,438, dated Dec. 2, 2009, 8 pages.
United States Patent and Trademark Office, Final Office Action for U.S. Appl. No. 10/455,438, dated Jun. 26, 2007, 10 pages.
United States Patent and Trademark Office, Final Office Action for U.S. Appl. No. 10/713,100, dated Oct. 28, 2008, 9 pages.
United States Patent and Trademark Office, Final Office Action for U.S. Appl. No. 10/713,100, dated Oct. 30, 2009, 11 pages.
United States Patent and Trademark Office, Final Office Action for U.S. Appl. No. 10/713,100, dated Jun. 14, 2007, 14 pages.
United States Patent and Trademark Office, Final Office Action for U.S. Appl. No. 10/867,768, dated May 28, 2009, 7 pages.
United States Patent and Trademark Office, Final Office Action for U.S. Appl. No. 10/867,768, dated Jun. 1, 2006, 8 pages.
United States Patent and Trademark Office, Final Office Action for U.S. Appl. No. 10/867,768, dated Jun. 25, 2010, 8 pages.
United States Patent and Trademark Office, Final Office Action for U.S. Appl. No. 10/867,768, dated Jul. 28, 2005, 7 pages.
United States Patent and Trademark Office, Final Office Action for U.S. Appl. No. 10/867,768, dated Jul. 5, 2007, 10 pages.
United States Patent and Trademark Office, Final Office Action for U.S. Appl. No. 11/039,885, dated Nov. 29, 2010, 19 pages.
United States Patent and Trademark Office, Final Office Action for U.S. Appl. No. 11/039,885, dated Dec. 16, 2009, 14 pages.
United States Patent and Trademark Office, Final Office Action for U.S. Appl. No. 11/039,885, dated Mar. 18, 2009, 12 pages.
United States Patent and Trademark Office, Final Office Action for U.S. Appl. No. 11/039,885, dated Sep. 10, 2009, 14 pages.
United States Patent and Trademark Office, Final Office Action for U.S. Appl. No. 11/039,886, dated Mar. 5, 2009, 16 pages.
United States Patent and Trademark Office, Final Office Action for U.S. Appl. No. 11/039,886, dated Jul. 9, 2010, 20 pages.
United States Patent and Trademark Office, Final Office Action for U.S. Appl. No. 11/039,886; dated Nov. 8, 2011, 56 pgs.
United States Patent and Trademark Office, Final Office Action for U.S. Appl. No. 11/327,160, dated Feb. 23, 2007, 10 pages.
United States Patent and Trademark Office, Final Office Action for U.S. Appl. No. 11/327,160, dated Mar. 25, 2008, 11 pages.
United States Patent and Trademark Office, Final Office Action for U.S. Appl. No. 11/327,176, dated Dec. 22, 2010, 11 pages.
United States Patent and Trademark Office, Final Office Action for U.S. Appl. No. 11/327,176, dated Dec. 9, 2009, 11 pages.
United States Patent and Trademark Office, Final Office Action for U.S. Appl. No. 11/824,358, dated Jun. 29, 2010, 15 pages.

(56) References Cited

OTHER PUBLICATIONS

United States Patent and Trademark Office, Final Office Action for U.S. Appl. No. 11/824,358; dated Nov. 15, 2011, 35 pgs.
United States Patent and Trademark Office, Final Office Action for U.S. Appl. No. 11/039,886, dated Nov. 8, 2011, 29 pages.
Gabber et al., "Curbing June E-Mail via Secure Classification," FC-98: Proceedings of the Second International Conference on Financial Cryptography, 1998, pp. 198-213.
Gator Press Release "Gator Helps Consumers at More Than 25,000 E-Commerce and Registration Sites in First Month of Usage: Software an invaluable companion for more than 80,000 online consumers," Aug. 3, 1999, pp. 1-2.
Gator Press Release "Gator.Com Delivers on the Promise of the Electronic Commerce Modeling Language (ECML) Standard Today: Gator offers one click shopping at over 5,000 e-commerce sites today," Jun. 14, 1999, pp. 1-2.
Gator Press Release "Internet Start-up Gator.com Introduces Gator, the Web's First Smart Online Companion: New Internet product offers one-click login and express registration and checkout across the web," Jun. 14, 1999, pp. 1-3.
Gburzynski, "A Comprehensive Approach to Eliminating Spam," Proceedings of Euromedia, Plymouth, UK, Apr. 2003, 5 pages.
Gunnerson, "EZ Login," *PC Magazine*, Mar. 14, 2000, pp. 1-2.
Hall, "How to Avoid Unwanted Email," Communications of the Association for Computing Machinery, vol. 41, No. 3, Mar. 1, 1998, pp. 88-95.
Hallam-Baker, "Security Assertions Markup Language. Core Assertion Architecture—Examples and Explanations," Internet Citation, http://www.oasis-open.org/committees/security/docs/draft-sstc-core-phill-07.pdf, May 14, 2001, 24 pages.
International Search Report for PCT/CA2003/000857; Applicant: Hardt, Dick, C., Filed on Jun. 6, 2003, dated Dec. 12, 2003, 7 pages.
International Search Report for PCT/CA2003/01774, Applicant: Sxip Networks Srl, Filed on Nov. 17, 2003, dated Jul. 13, 2004, 3 pages.
International Search Report for PCT/CA2005/000934; Applicant: Sxip Networks Srl; Filed on Jun. 16, 2005, dated Sep. 28, 2005, 4 pages.
International Search Report for PCT/CA2005/000935, Applicant: Sxip Networks Srl, Filed on Jun. 16, 2005, dated Oct. 4, 2005, 3 pages.
International Search Report for PCT/CA2005/000936, Applicant: Sxip Networks Srl, Filed on Jun. 16, 2005, dated Oct. 6, 2005, 3 pages.
International Search Report for PCT/CA2005/000937; Applicant: Sxip Networks Srl, Filed on Jun. 16, 2005, dated Sep. 20, 2005; 3 pages.
Kormann et al., "Risks of the Passport single sign on protocol," *Computer Networks*, Elsevier Science Publishers S. V., vol. 33, No. 1-6, Jun. 2000, pp. 51-58, XP004304758.
Lopez et al., "Ubiquitous Internet access control: the PAPI system," Proc. of the 13th International Workshop on Database and Expert Systems Applications (DEXA'02), Sep. 2. 2002, pp. 368-372, XP010612047.
Marchiori, "Platform for Privacy Preference (P3P) Syntex Specification," Internet Citation, http://classic-web.archive.org/web/20031207022324/www.w3.org/tr/1999/wd-p3p-19990826/syntax, Aug. 26, 1999, pp. 1-25.
Menezes et al., "Handbook of Applied Cryptography," Chapter 12, Section 12.5.2, pp. 509-512, 1997.
Microsoft Press Release, "Microsoft Passport Offers Streamlined Purchasing Across Leading Web Sites," Oct. 11, 1999, pp. 1-4.
Microsoft PressPass, Microsoft.NET: "A Platform for the Next Generation Internet," Jun. 22, 2000, pp. 1-7.
"Microsoft.NET Passport Technical Overview," Sep. 2001, 29 pages.
Microsoft.NET Passport, "What's New," Sep. 2001, 14 pages.
United States Patent and Trademark Office, Non Final Office Action and Interview Summary for U.S. Appl. No. 09/933,567, dated Feb. 20, 2007, 16 pages.
United States Patent and Trademark Office, Non Final Office Action for U.S. Appl. No. 09/923,285, dated Jul. 12, 2004, 11 pages.
United States Patent and Trademark Office, Non Final Office Action for U.S. Appl. No. 09/933,567, dated Sep. 29, 2005, 9 pages.
United States Patent and Trademark Office, Non Final Office Action for U.S. Appl. No. 09/974,766, dated Feb. 4, 2005, 14 pages.
United States Patent and Trademark Office, Non Final Office Action for U.S. Appl. No. 09/988,811, dated Jan. 23, 2006, 12 pages.
United States Patent and Trademark Office, Non Final Office Action for U.S. Appl. No. 09/988,811, dated Dec. 5, 2007, 7 pages.
United States Patent and Trademark Office, Non Final Office Action for U.S. Appl. No. 09/988,811, dated Jul. 11, 2005, 5 pages.
United States Patent and Trademark Office, Non Final Office Action for U.S. Appl. No. 09/988,811, dated Jul. 14, 2009, 9 pages.
United States Patent and Trademark Office, Non Final Office Action for U.S. Appl. No. 09/988,811, dated Aug. 18, 2010, 8 pages.
United States Patent and Trademark Office, Non Final Office Action for U.S. Appl. No. 10/455,438, dated Jan. 10, 2007, 12 pages.
United States Patent and Trademark Office, Non Final Office Action for U.S. Appl. No. 10/455,438, dated Feb. 5, 2008, 11 pages.
United States Patent and Trademark Office, Non Final Office Action for U.S. Appl. No. 10/713,100, dated Dec. 5, 2006, 15 pages.
United States Patent and Trademark Office, Non Final Office Action for U.S. Appl. No. 10/713,100, dated Feb. 27, 2009, 8 pages.
United States Patent and Trademark Office, Non Final Office Action for U.S. Appl. No. 10/713,100, dated Mar. 26, 2008, 8 pages.
United States Patent and Trademark Office, Non Final Office Action for U.S. Appl. No. 10/867,635, dated Nov. 21, 2007, 5 pages.
United States Patent and Trademark Office, Non Final Office Action for U.S. Appl. No. 10/867,768, dated Oct. 31, 2008, 7 pages.
United States Patent and Trademark Office, Non Final Office Action for U.S. Appl. No. 10/867,768, dated Dec. 15, 2006, 7 pages.
United States Patent and Trademark Office, Non Final Office Action for U.S. Appl. No. 10/867,768, dated Dec. 19, 2005, 8 pages.
United States Patent and Trademark Office, Non Final Office Action for U.S. Appl. No. 10/867,768, dated Dec. 30, 2009, 8 pages.
United States Patent and Trademark Office, Non Final Office Action for U.S. Appl. No. 10/867,768, dated Mar. 24, 2008, 6 pages.
United States Patent and Trademark Office, Non Final Office Action for U.S. Appl. No. 10/867,768, dated Mar. 30, 2005, 8 pages.
United States Patent and Trademark Office, Non Final Office Action for U.S. Appl. No. 11/039,885, dated Jun. 17, 2008, 11 pages.
United States Patent and Trademark Office, Non Final Office Action for U.S. Appl. No. 11/039,885, dated Jun. 3, 2010, 17 pages.
United States Patent and Trademark Office, Non Final Office Action for U.S. Appl. No. 11/039,886, dated Feb. 9, 2009, 20 pages.
United States Patent and Trademark Office, Non Final Office Action for U.S. Appl. No. 11/039,886, dated Jun. 24, 2008, 14 pages.
United States Patent and Trademark Office, Non Final Office Action for U.S. Appl. No. 11/039,886, dated Jun. 8, 2011, 33 pages.
United States Patent and Trademark Office, Non Final Office Action for U.S. Appl. No. 11/327,160, dated Oct. 4, 2007, 9 pages.
United States Patent and Trademark Office, Non Final Office Action for U.S. Appl. No. 11/327,160, dated Jul. 12, 2006, 12 pages.
United States Patent and Trademark Office, Non Final Office Action for U.S. Appl. No. 11/327,176, dated May 28, 2009, 12 pages.
United States Patent and Trademark Office, Non Final Office Action for U.S. Appl. No. 11/327,176, dated Jun. 9, 2010, 12 pages.
United States Patent and Trademark Office, Non Final Office Action for U.S. Appl. No. 11/824,358, dated Jan. 29, 2010, 13 pages.
United States Patent and Trademark Office, Non Final Office Action for U.S. Appl. No. 11/824,358, dated Oct. 8, 2010, 12 pages.
United States Patent and Trademark Office, Non Final Office Action for U.S. Appl. No. 11/824,358, dated Mar. 18, 2011, 8 pages.
United States Patent and Trademark Office, Non Final Office Action U.S. Appl. No. 10/007,785, dated Mar. 2, 2005, 26 pages.
United States Patent and Trademark Office, Non-Final Office Action for U.S. Appl. No. 09/988,811; dated Oct. 13, 2011, 34 pgs.
United States Patent and Trademark Office, Non-Final Office Action for U.S. Appl. No. 11/039,885, dated Aug. 26, 2011, 36 pgs.
United States Patent and Trademark Office, Notice of Allowance and Interview Summary for U.S. Appl. No. 09/974,766, dated Nov. 22, 2005, 10 pages.

(56) References Cited

OTHER PUBLICATIONS

United States Patent and Trademark Office, Notice of Allowance and Interview Summary for U.S. Appl. No. 10/713,100, dated Apr. 16, 2010, 12 pages.
United States Patent and Trademark Office, Notice of Allowance for U.S. Appl. No. 09/923,285, dated Apr. 12, 2007, 13 pages.
United States Patent and Trademark Office, Notice of Allowance for U.S. Appl. No. 09/933,567, dated Aug. 11, 2008, 9 pages.
United States Patent and Trademark Office, Notice of Allowance for U.S. Appl. No. 10/007,785, dated Nov. 22, 2005, 10 pages.
United States Patent and Trademark Office, Notice of Allowance for U.S. Appl. No. 10/007,785, dated Feb. 10, 2006, 3 pages.
United States Patent and Trademark Office, Notice of Allowance for U.S. Appl. No. 10/455,438, dated Apr. 30, 2010, 10 pages.
United States Patent and Trademark Office, Notice of Allowance for U.S. Appl. No. 10/867,635, dated Jun. 20, 2008, 4 pages.
United States Patent and Trademark Office, Notice of Allowance for U.S. Appl. No. 11/327,160, dated Sep. 10, 2008, 12 pages.
United States Patent and Trademark Office, Notice of Allowance for U.S. Appl. No. 12/851,464, dated Oct. 5, 2011, 41 pgs.
United States Patent and Trademark Office, Office Action for U.S. Appl. No. 09/988,811, dated Aug. 11, 2006, 4 pages.
United States Patent and Trademark Office, Office Action for U.S. Appl. No. 10/455,438, dated Mar. 25, 2009, 11 pages.
Papadimitratos, P. et al., "Secure Routing for Mobile Ad hoc Networks," In Proceedings of the SCS Communication Networks and Distributed Systems Modeling and Simulation Conference, San Antonio, TX, Jan. 2002, pp. 1-13.
Rauschenberger, Secure Your Web Site With Passport, "Simplify Your Web Site Visitors' Experience by Authenticating Them," *Visual Studio Magazine*, Apr. 4, 2002, pp. 1-3.
United States Patent and Trademark Office, Restriction Requirement for U.S. Appl. No. 09/933,567, dated Jun. 17, 2005, 5 pages.
United States Patent and Trademark Office, Restriction Requirement for U.S. Appl. No. 09/988,811, dated Mar. 7, 2007, 4 pages.
United States Patent and Trademark Office, Restriction Requirement for U.S. Appl. No. 11/039,886, dated Sep. 14, 2009, 4 pages.
United States Patent and Trademark Office, Restriction Requirement for U.S. Appl. No. 11/327,176, dated Feb. 17, 2009, 6 pages.
United States Patent and Trademark Office, Restriction Requirement for U.S. Appl. No. 11/327,176, dated Mar. 20, 2008, 6 pages.
United States Patent and Trademark Office, Restriction Requirement for U.S. Appl. No. 11/327,176, dated Jul. 9, 2008, 7 pages.
United States Patent and Trademark Office, Restriction Requirement for U.S. Appl. No. 12/434,803; dated Nov. 14, 2011, 7 pgs.
United States Patent and Trademark Office, Restriction Requirement for U.S. Appl. No. 11/824,358, dated Aug. 3, 2009, 7 pages.
Secure Your Web Site With Passport, "Implement Passport," *Visual Studio Magazine*, Apr. 4, 2002, pp. 1-3.
Secure Your Web Site With Passport, "Passport Key to HailStrom's Success," *Visual Studio Magazine*, Apr. 4, 2002, pp. 1-2.
Secure Your Web Site With Passport, "Sign In, Please," *Visual Studio Magazine*, Apr. 4, 2002, pp. 1-3.
United States Patent and Trademark Office, Supplemental Advisory Action for U.S. Appl. No. 11/039,885, dated Apr. 1, 2010, 3 pages.
Supplementary European Search Report for PCT/CA2005/000934, Applicant: Sxip Networks Srl, Filed on Jun. 16, 2005, dated May 27, 2011, 3 pages.
Supplementary European Search Report for PCT/CA2005/000935, Applicant: Sxip Networks Srl, Filed on Jun. 16, 2005; dated Apr. 4, 2011, 3 pages.
Supplementary European Search Report for PCT/CA2005/000936, Applicant: Sxip Networks Srl, Filed on Jun. 16, 2005, dated Jul. 19, 2010, 3 pages.
Supplementary European Search Report for PCT/CA2005/000937, Applicant: Sxip Networks Srl, Filed on Jun. 16, 2005, dated Jul. 19, 2010, 4 pages.
Tenebaum et al. "Commercenet Consortium," AFRL-ML-WP-TR-1999-4147. Air Force Materiel Command, Wright-Patterson AFB, Jul. 1999, 79 pages.
United States Patent and Trademark Office, Advisory Action, U.S. Appl. No. 10/867,768, dated Aug. 14, 2014, 3 pages.
United States Patent and Trademark Office, Advisory Action, U.S. Appl. No. 12/434,803, dated Nov. 29, 2013, 3 pages.
United States Patent and Trademark Office, Final Office Action, U.S. Appl. No. 10/867,768, dated Jun. 6, 2014, 9 pages.
United States Patent and Trademark Office, Final Office Action, U.S. Appl. No. 11/327,176, dated Oct. 27, 2014, 15 pages.
United States Patent and Trademark Office, Non-Final Office Action, U.S. Appl. No. 10/867,768, dated Oct. 7, 2013, 10 pages.
United States Patent and Trademark Office, Non-Final Office Action, U.S. Appl. No. 11/327,176, dated Mar. 21, 2014, 16 pages.
United States Patent and Trademark Office, Non-Final Office Action, U.S. Appl. No. 12/434,803, dated Mar. 18, 2014, 17 pages.
United States Patent and Trademark Office, Non-Final Office Action, U.S. Appl. No. 14/015,813, dated Apr. 21, 2014, 15 pages.
United States Patent and Trademark Office, Notice of Allowance, U.S. Appl. No. 14/015,813, dated Sep. 26, 2014, 8 pages.
United States Patent and Trademark Office, Advisory Action, U.S. Appl. No. 10/867,768, dated Nov. 9, 2012, 2 pages.
United States Patent and Trademark Office, Advisory Action, U.S. Appl. No. 12/434,803, dated Oct. 23, 2012, 3 pages.
United States Patent and Trademark Office, Final Office Action, U.S. Appl. No. 09/988,811, dated May 14, 2012, 16 pages.
United States Patent and Trademark Office, Final Office Action, U.S. Appl. No. 10/867,768, dated Aug. 30, 2012, 13 pages.
United States Patent and Trademark Office, Final Office Action, U.S. Appl. No. 11/039,885, dated Aug. 15, 2012, 16 pages.
United States Patent and Trademark Office, Final Office Action, U.S. Appl. No. 11/039,886, dated Jan. 14, 2013, 31 pages.
United States Patent and Trademark Office, Final Office Action, U.S. Appl. No. 12/434,803, dated Aug. 14, 2012, 11 pages.
United States Patent and Trademark Office, Final Office Action, U.S. Appl. No. 12/434,803, dated Aug. 28, 2013, 12 pages.
United States Patent and Trademark Office, Non-Final Office Action, U.S. Appl. No. 10/867,768, dated Feb. 6, 2012, 40 pages.
United States Patent and Trademark Office, Non-Final Office Action, U.S. Appl. No. 11/039,885, dated Nov. 9, 2012, 17 pages.
United States Patent and Trademark Office, Non-Final Office Action, U.S. Appl. No. 11/039,886, dated Aug. 21, 2012, 27 pages.
United States Patent and Trademark Office, Non-Final Office Action, U.S. Appl. No. 12/434,803, dated Dec. 7, 2012, 15 pages.
United States Patent and Trademark Office, Non-Final Office Action, U.S. Appl. No. 12/434,803, dated Mar. 1, 2012, 12 pages.
United States Patent and Trademark Office, Notice of Allowance, U.S. Appl. No. 09/988,811, dated May 24, 2013, 19 pages.
United States Patent and Trademark Office, Notice of Allowance, U.S. Appl. No. 11/039,885, dated Apr. 29, 2013, 15 pages.
United States Patent and Trademark Office, Notice of Allowance, U.S. Appl. No. 11/039,886, dated Apr. 5, 2013, 8 pages.
United States Patent and Trademark Office, Notice of Allowance, U.S. Appl. No. 11/824,358, dated May 1, 2012, 9 pages.
United States Patent and Trademark Office, Supplemental Notice of Allowability, U.S. Appl. No. 11/824,358, dated Jun. 18, 2012, 6 pages.
United States Patent and Trademark Office, Non-Final Office Action, U.S. Appl. No. 12/434,803, dated Aug. 14, 2015, 13 pages.
United States Patent and Trademark Office, Notice of Allowance, U.S. Appl. No. 10/867,768, dated Sep. 17, 2015, 16 pages.
United States Patent and Trademark Office, Notice of Allowance, U.S. Appl. No. 14/622,722, dated Feb. 29, 2016, 35 pages.
United States Patent and Trademark Office, Non Final Office Action, U.S. Appl. No. 11/327,176, dated Sep. 2, 2016, 15 pages.
United States Patent and Trademark Office, Non-Final Office Action, U.S. Appl. No. 14/941,528, dated Jan. 26, 2018, 10 pages.
United States Patent and Trademark Office, Advisory Action, U.S. Appl. No. 11/327,176, dated Jul. 12, 2017, 3 pages.
United States Patent and Trademark Office, Notice of Allowance, U.S. Appl. No. 11/327,176, dated Nov. 16, 2017, 9 pages.

\* cited by examiner

GRADUATED AUTHENTICATION IN AN IDENTITY MANAGEMENT SYSTEM

CROSS REFERENCE TO RELATED APPLICATIONS

This application is a continuation of U.S. application Ser. No. 14/622,722, filed Feb. 13, 2015 (U.S. Pat. No. 9,398,020), which is a continuation of U.S. application Ser. No. 14/015,813, filed Aug. 30, 2013 (U.S. Pat. No. 8,959,652), which is a continuation of U.S. application Ser. No. 11/039,885, filed Jan. 24, 2005 (U.S. Pat. No. 8,527,752), which claims the benefit of U.S. Provisional Application No. 60/579,890, filed Jun. 16, 2004 and U.S. Provisional Application No. 60/605,150, filed Aug. 30, 2004, which are all incorporated herein by reference in their entireties.

FIELD OF THE INVENTION

The present invention relates generally to electronic identity management systems. More particularly, the present invention relates to authentication and security for data exchange in a distributed hierarchical identity management system.

BACKGROUND OF THE INVENTION

In the field of identity management, there are a number of known systems for providing user identity services on the Internet. Microsoft's Passport™, and the Liberty Alliance identity management system are two such known examples, as are the identity management systems taught in Canadian Patent No. 2,431,311, and Canadian Patent Application Nos. 2,458,257, 2,468,351, and 2,468,585.

Many known identity management systems offer secure logins, allowing a user to visit a site in the network (membersite) and obtain a secure login to that site using an identity store to authenticate the user identity over a secure channel. The use of a secure channel allows an identity store to provide the membersite with user login information and/or confidential user information.

However, the reliance on secure channels increases the barrier to entry for membersites. Under a secure setup, lightweight, or simple, login is encumbered by the overhead of a secure channel.

In an identity management system that relies upon homesites to act as an identity store which stores user identity information, it may be advantageous to provide a form of graduated security to allow a membersite to obtain identity information, including authentication, using a number of different channels, each with different security features.

There is a further need for a mechanism through which a webservice provider can obtain user authentication and authorization for a third party to receive information. At present, if a third party wishes to aggregate information from a number of webservice providers for the user, or if a third party requires information from a webservice provider to further process before providing the results to a user, the third party and the webservice must be heavily linked. Typically, the third party must become associated with the webservice, and have its services bundled by the webservice provider. Thus a financial institution can use an aggregation service to perform analysis on a client's holdings, but a client cannot easily obtain an aggregation across a number of financial institutions. There is therefore a need for a mechanism for third parties to provide authentication of a user authorization for release of information provided by a webservice.

There are at present a number of contact management services that allow a user to provide a list of known contacts. If the contacts provided a user subscribe to the same service, when one of the users updates a segment of a profile, the change is automatically reflected in the other users contact list. However, at present, these services are highly centralized. There is no automated mechanism to obtain information about users that have not subscribed. There is a plurality of these services, and at present there is no convenient mechanism for data exchange between them. This results in users forming small collective islands of contact sharing. There is a need for a distributed contact management system that allows users to share information with people in a vast identity management system that allows for automated updating of contact information.

It is, therefore, desirable to provide an identity management system that can provide at least one of improved gradations in the security levels, support for third party webservices and support for distributed contact management.

SUMMARY OF THE INVENTION

It is an object of the present invention to obviate or mitigate at least one disadvantage of previous identity management systems.

In a first aspect of the present invention, there is provided a method of selecting a security level for transmitting identity information from a homesite in an identity management network to a membersite in the identity management network. The method comprises the steps of receiving a request from a membersite; determining, in accordance with a security level associated with the received request, the security level for transmitting the response to the request and transmitting the response to the received request over a channel selected in accordance with the determined security level.

In an embodiment of the first aspect of the present invention, the received request is a request for identity information, a request for authentication of a user identity, or a combination of the two. In another embodiment, the security level associated with the received request is selected from a list including an authentication security level, a channel security level and a time sensitivity security level. In other embodiment, s the step of determining includes selecting a security level at least as secure as a level associated with the received request. In other embodiments, the step of determining includes one of selecting a security level specified in the received request, selecting a security level in accordance with information specified in the received request and selecting a security level in accordance with user preferences, that predefined and are associated with the information requested in the received request. The security level can also be selected in accordance with homesite policies.

In another aspect of the present invention, there is provided a homesite, in an identity management system, for receiving information requests from a membersite in the identity management system, and for determining a security level for transmitting a response to received information requests. The homesite comprises an input, an authentication engine, and a response engine. The input receives an information request from a membersite. The authentication engine authenticates a user associated with the information request. The response engine assembles information associated with the user in accordance with the received authentication request, and transmits the assembled information to the membersite over a channel selected in accordance with a security level determined in accordance with the received information request.

In an embodiment of the second aspect of the present invention, the response engine includes a security level determining engine for selecting one of an authentication security level, a channel security level and a time sensitivity security level. IN another embodiment, the response engine includes a security level determining engine for selecting a security level at least as secure as a level associated with the received request, for selecting a security level specified in the request or for selecting a security level in accordance with information specified in the received request. In another embodiment, the security level determining engine determines the security level in accordance with user preferences or a homesite policy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
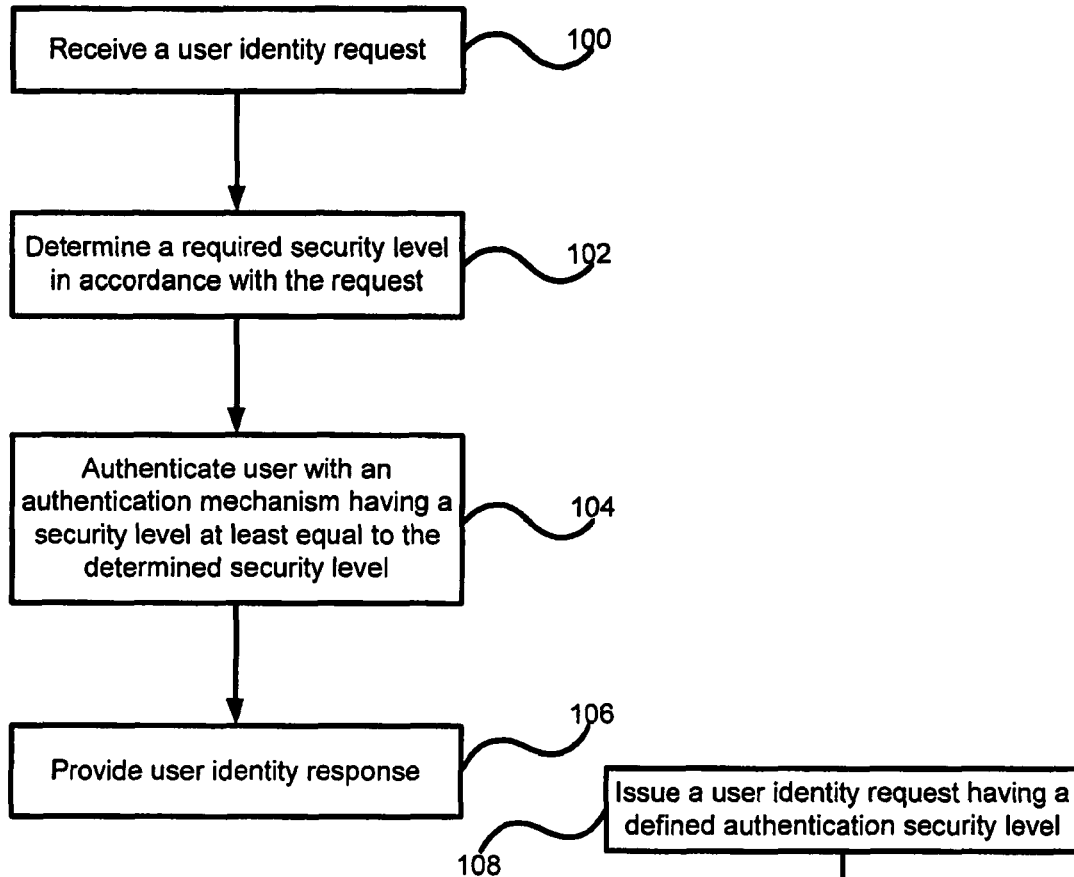
FIG. 1 is a flowchart illustrating a method of the present invention.

Generally, the present invention provides a method and system for identity management supporting graduated security levels, third party web services and contact management.

In the following discussion, a hierarchical distributed identity management system is assumed, though one skilled in the art will appreciate that a number of these techniques can be utilized in other identity management networks or other environments where transactional security is of importance.

In view of the need for a graduated security mechanism, the system of the present invention can provide a series of different levels of security. As noted with regard to the prior art, a mechanism for providing a series of graduated security levels provides membersites with the ability to determine the degree of security that they require. For sites that relied upon identification by the presence of a cookie, as many news based website do, or sites that relied upon simple username password combinations transmitted in cleartext prior to joining the identity management network, there is little need for requiring a very secure user identification channel. For such sites, requiring a secure login with signature verification for exchanged data serves as a barrier for entry. On the other side of the equation, financial service websites or websites providing medical histories are best served by very secure logins, with a mechanism that reduces the ability of malicious parties to perform man-in-the-middle type attacks. To provide such a varied login, the system of the present invention allows for a graduated security login. The graduated security login can use both differentiated levels of user authentication and differentiated levels of channel security.

In prior art identity management systems, users are authenticated by providing a user identifier, such as a username, and a shared secret, such as a password. In other systems, typically reserved for specialty uses, other information was used in place of a shared secret, including fingerprint or biometric data. If the provided information was sufficiently unique, as it is with fingerprint and biometric data, the provision of this information was sufficient, and a user identifier was not required. Thus, depending on the level of security required for the authentication, different information has been required. However, in the prior art, login information has been globally set, so that regardless of what a user may want to do the same authentication test was applied. In the context of a membersite requesting user authentication, this is particularly cumbersome. A user, who is being authenticated by a news site so that a particular presentation layout can be selected based on user preference, does not need to be bothered with a request to authenticate using a user name and password, especially if the user has been recently authenticated. Additionally, the news site does not necessarily want the user to be authenticated by a username and password combination, or an even stronger authentication mechanism, as it makes the process too cumbersome for the user and diminishes the likelihood that the user will visit the site. Conversely, a financial institution may want the user to be authenticated by a homesite regardless of when the user was last authenticated, and may demand that that authentication. Similarly, a medical database may want to force the user to authenticate with the homesite and use a particularly robust authentication mechanism, such as a biometric scan, so that there is confidence that the user has been properly authenticated.

To service the varied needs of different membersites, the homesite can support a series of different authentication levels. By supporting the plurality of different authentication mechanisms, the homesite can receive requests from a membersite to authenticate at a certain level of security. Additionally, a user can set a preference that when certain information, such as a credit card number, is requested, the homesite will only release it if authentication at a predefined level has been obtained. Thus, when a homesite receives a request for user information or user authentication, it can determine from both the request, and the requested information, the level of user authentication that is required. If the request for authentication and the requested information specify different levels of security, the homesite can use the higher of the two for the maximum security.

One skilled in the art will appreciate that different dimensions of security can be applied independently of each other. Differing levels of user authentication security can be applied, so that users can be required to provide different complexities of authentication information, as can differing levels of security in the communication channel formed between the membersite and homesite through the user's browser. As a further dimension to the security level, a time sensitivity factor can be required of the user authentication, so that differing levels of user authentication security can be combined with a staleness factor that allows authentication of a user within a fixed period of time to be varied.

FIG. 1 illustrates an exemplary embodiment of a method for executing the above-described graduated authentication system. In step 100 a homesite receives a user identity request from a membersite. A user identity request typically includes a request for one or both of user authentication and information about the user. In step 100 the homesite determines a required security level in accordance with the request. This determination can take the form of examining the request to determine a membersite's explicit request for a security level, examining user preferences which indicate that a user wishes to authenticate with nothing less than a specified authentication security level, examining a user specified minimum authentication security level associated with requested identity information, and optionally a set of homesite policies regarding the authentication of users at minimum security levels can also be used in the determination of the required authentication security level. The determined security level is preferably a combination of both authentication security and a time limit. The time limit defines an acceptable level of staleness in the authentication, allowing the combined security level either to force the user to authenticate, or to allow a previous authentication. In step 104, the user is authenticated using an authentication mechanism having combination of a security level and time factor at least equal to the determined combined security level. For example, the determined combined security level could be that the user has been previously authenticated using a username and password, has been authenticated within a predetermined time limit previously, the user must authenticate for this transaction using a user name and password pair, a username and password pair in conjunction with another shared secret, or with biometric authentication. The previous list is intended to be exemplary, and in no way should it be considered exhaustive of either of the two dimensions of security or of their combination. Upon successful user authentication, the homesite provides the membersite with a user identity response in step 106. This response preferably contains the requested user information, and a statement from the homesite detailing the security level at which the user was authenticated. One skilled in the art will appreciate that the membersite can include in the user identity request a list of acceptable authentication mechanisms, and the homesite would them determine the required security level by selecting one from the provided list, optionally doing so in accordance with user preferences and homesite policies.

Thus, a homesite can use any of a number of authentication methods, and preferably uses the one specified by the membersite. To allow for authentication methods to be properly specified, each authentication method can be assigned a security level, allowing the membersite to request authentication at a desired level. The homesite can then use any authentication method at, or above, that level to authenticate the user.

From the perspective of a membersite, when a user visits, the membersite can determine that the user has a homesite, through any number of known mechanisms, including looking for a cookie in a shadow domain. The user can be redirected to the homesite with a request for authentication, possibly including an information request. This request includes an indication of the security level, preferably for both the authentication and the time sensitivity, required. When a response from the homesite is received, the response can include a statement, preferably signed by the homesite, that authentication was performed at a given level either at or in excess of the one specified by the membersite.

Figure 2:
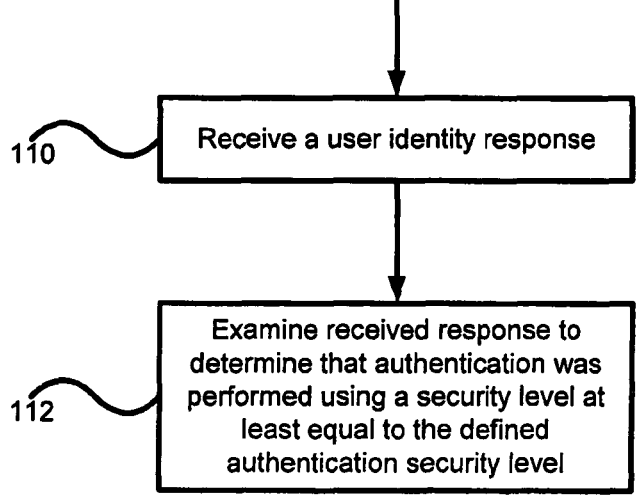
FIG. 2 is a flowchart illustrating a method of the present invention.

FIG. 2 is a flowchart illustrating an exemplary embodiment of a method to implement the above-described graduated authentication method from the perspective of the membersite. In step 108, the membersite issues a user identity request containing a defined authentication security level. In step 110, the membersite receives the homesite's user identity response. In step 112, the membersite examines the user identity response to determine the security level at which the user was authenticated. The determined security level can then be compared to the security level defined in step 108. If the level does not meet the requirements, the membersite can handle the error in any number of ways. As an example, if a membersite is a financial institution that in a login procedure obtains the user login information from a homesite, and the membersite specifies that the user must authenticate using a user name and password combination, and receives an identity response that was authenticated on the basis of a previous authentication, the membersite can refuse the user login. The membersite can then present the user with a notice that the homesite did not use the required authentication and then query the user for account information for an out-of-identity-management-network login.

As an example of the above described authentication security levels, consider the scenario of a news server that provides users with specified layout and content filtering based on saved user profiles. When a user visits the news server, the server sends the user to the homesite for authentication, and specifies that the lowest form of authentication is required, which in this scenario is that the user possesses a cookie from the homesite indicating that an authentication has occurred in the last 30 days. The homesite receives the user authentication request, determines that the user identifier, such as a globally unique persona identifier or a pairwise unique identifier, can be released without obtaining further user authentication as the user has previously authenticated. The user's identifier, along with a statement that authentication has been performed at or above the desired level, is then provided to the news server in a response signed by the homesite. The news server can then cross reference the user identifier with a set of preferences to display the news content in the desired format. Upon reading a story, the user clicks on a link to purchase a photo associated with one of the news stories. The purchase will be done on a credit card, whose information is stored by the homesite. The news server sends a request for user information to the homesite and requests the user's credit card number and a shipping address. The news server requests that the homesite authenticate the user using at least a username and password combination. The homesite receives the request for user information, and checks the user preferences related to the release of information. These preferences indicate that though the user will release a shipping address from a username and password challenge, a stronger challenge, such as a username and a response to two personal identification questions selected from a pool of questions, must be used to release a credit card number. The homesite then randomly selects two questions from a pool of questions, including information such as birthdate, place of birth, mother's maiden name, a favorite color, and a pet's name. These questions are provided to the user as a challenge. Upon successful completion of the challenge, the information is released to the news server in a signed response that includes an indication that a challenge at least as rigorous as the username password was obtained. Other levels of security can include a biometric or fingerprint scan, an out of band challenge such as a telephone call placed to a designated phone number, an out of band challenge including a password request in the out of band connection, automated token generation systems, and other known authentication mechanisms. One skilled in the art will appreciate that the above list is intended to be exemplary and not limiting in any manner.

As a companion to the above authentication security levels, the present invention can optionally provide a series of different channel configurations so that the channel between the membersite and homesite can have different levels of security itself. These two systems can be implemented independently of each other, though in combination they provide a large number of security options.

Figure 3:
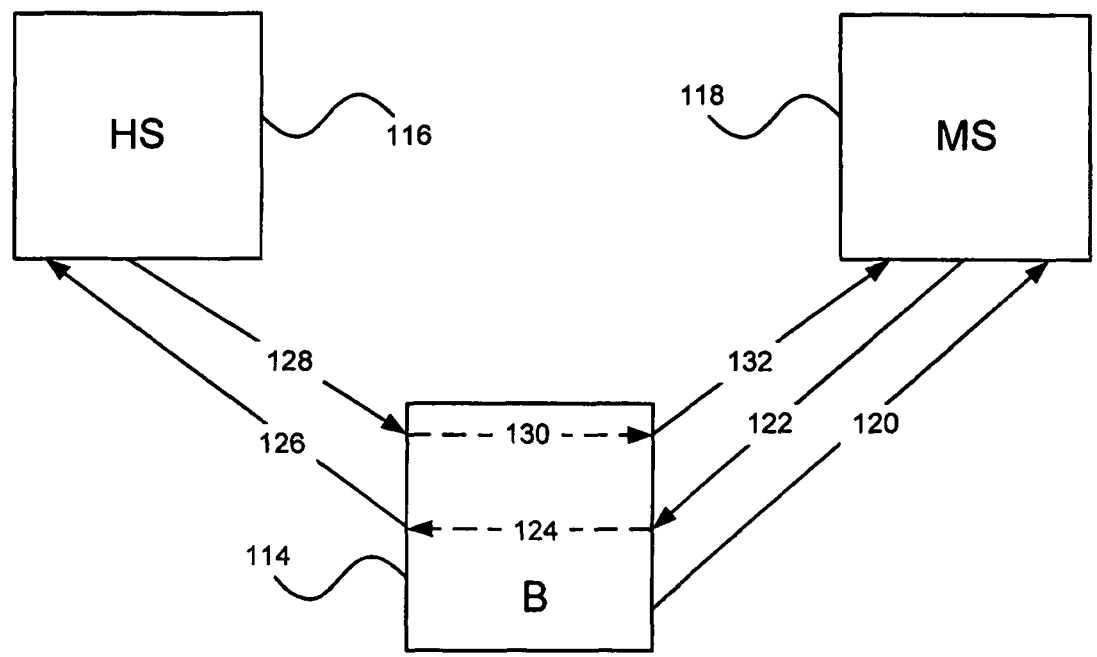
FIG. 3 is a block diagram illustrating a lightweight login in a system of the present invention.

FIG. 3 illustrates the data flow between the browser B 114 of a user, whose identity information is stored by homesite HS 116, when attempting a login to membersite MS 118. B 114 connects to MS 118 over a data connection 120. The degree of security required for the authentication operation can be determined by the needs of the membersite. In transactions that do not require high degrees of security, such as authentications that would otherwise be username and password pairs exchanged in the clear, encryption is not required at either end. As a result, after browser 114 connects to MS 118 over datapath 120, MS 118 requests authentication of the user by sending an authentication request to HS 116. This request is sent to HS 116 by sending an authentication request to B 114 over datapath 112. The request sent to B 114 contains a redirect command that redirects B 114 to HS 116 and sends the authentication request over datapath 126. Thus, the authentication request is sent over a virtual channel created by datapaths 122 and 126 connected by the user redirection shown as 124. HS 116 authenticates the user, using any of a number of techniques as described above, or in the prior art references, and then provides the requested information to MS 118 by sending it, via browser 114, on over the channel created by datapaths 128, 130 and 132. If MS 118 would have otherwise used a simple username and password pair transmitted in the clear, the authentication of the user at HS 116 may be done over a secure channel, but the data provided to MS 118 can be send in the clear over unsecured data path 132. This allows sites that do not require secure connections to belong to the identity management network without supporting secure connections. In a presently preferred embodiment, HS 116 will send a response to MS 118 using the same data connection type that MS 118 sends the authentication request using, unless otherwise specified. Thus, upon receiving the authentication request over unsecured channel 124, HS 116 provides the requested authentication to MS 118 over unsecured channel 130.

Figure 4:
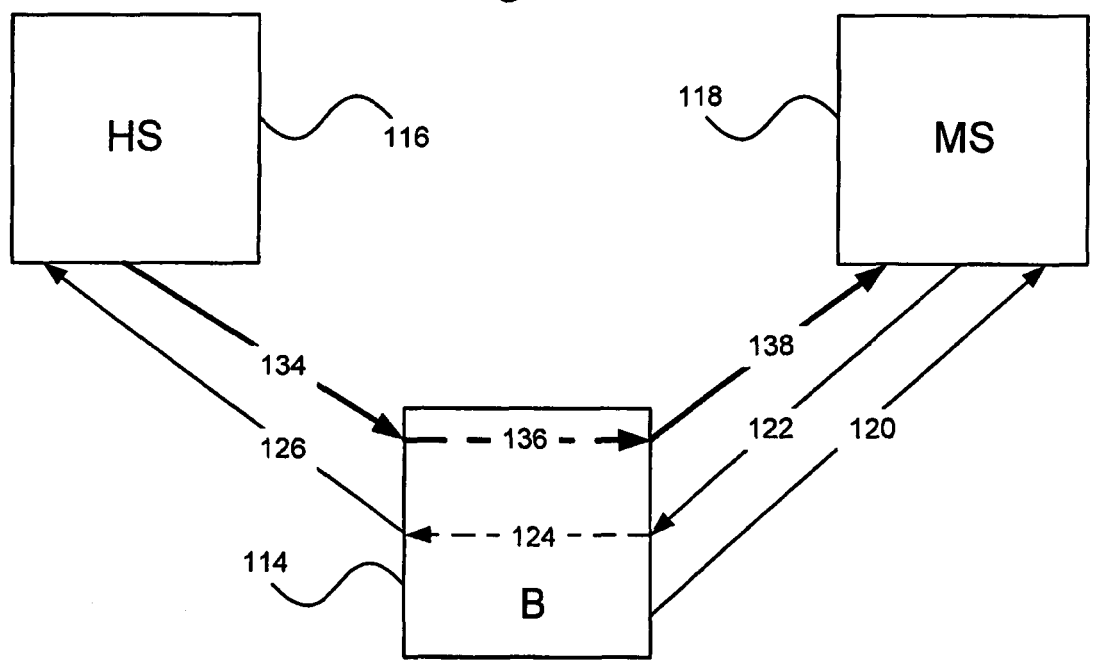
FIG. 4 is a block diagram illustrating an increased security login in a system of the present invention.

FIG. 4 illustrates the dataflow for a scenario where MS 118 requests data over an insecure channel, and HS 116 is required to send the data over a secure data channel. When making the authentication request, MS 118 may consider that though the confirmation of the user identity is confidential, the request for the information is not. As such, MS 118 may choose to not use a secure channel to request the authentication. MS 118 then transmits an authentication request to HS 116 over the unsecure virtual channel created by datapaths 122, 124 and 126. The request specifies that the response should be transmitted over a secure channel. This allows MS 118 to not cause a redirect to its own secure server at the time of making the request, and instead simply sends the user to HS 116. After authenticating the user of browser 114, and optionally obtaining user authorization, HS 118 redirects the user to MS 118 over secure channel 136. Security for the channel can be provided in any of a number of ways including the use of Secure Sockets Layer (SSL) connections, or the secure hypertext transfer protocol (https). If MS 118 requests more than authentication, and includes a request for user information, such as biographic or financial data, the secure return path 136 provides security for the transmitted data. One skilled in the art will appreciate that if a user specifies that certain data is only to be released over secure channels, HS 116 can, in response to a request, redirect browser 114 to MS 118 to provide the message that the response can only be provided over a secure link. Thus, the user can be guaranteed that confidential information is only provided in secure sessions.

Figure 5:
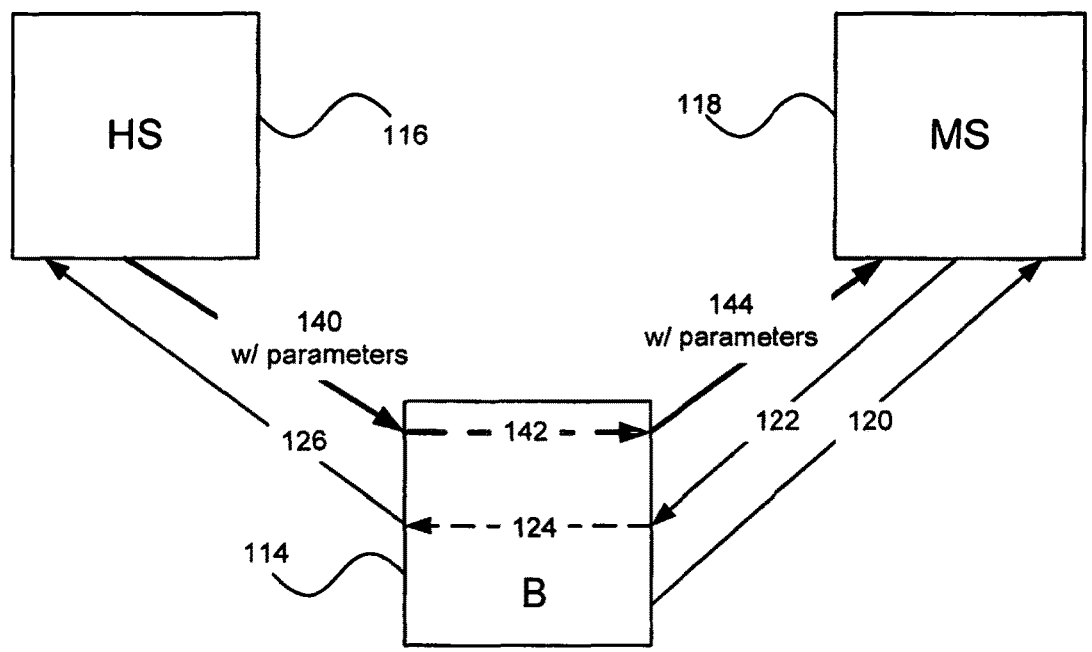
FIG. 5 is a block diagram illustrating a further increased security login in a system of the present invention.

In certain attacks on secure servers a "man in the middle" is used, so that requests for information are intercepted, modified, and then passed along. If a man in the middle type attack of this sort is attempted on the system of FIG. 4, HS 116 will receive a request for additional information, but will only send it over a secure channel. Nonetheless, it may be beneficial for MS 118 to be able to easily identify such attacks. To allow for this, a further gradient of security can be introduced. Such a further security gradient is illustrated in the dataflows of FIG. 5. After B 114 connects to MS 118 over connection 120, MS 118 makes an authentication or information request from HS 116, by redirecting B 114 to HS 116 over the virtual channel created by datapaths 122, 124 and 126. After authenticating the user of B 114, and optionally obtaining user approval for the release of information, HS 116 sends the requested information or authentication to MS 118 via B 114, by redirecting B 114 over the virtual channel created by datapaths 140 142 and 144. However, in addition to using a secure channel, HS 116 includes in the response the parameters of the request. MS 118, upon receipt of the response, can then easily identify if the parameters have been modified. This alerts MS 118 to the start of a man in the middle attack.

Figure 6:
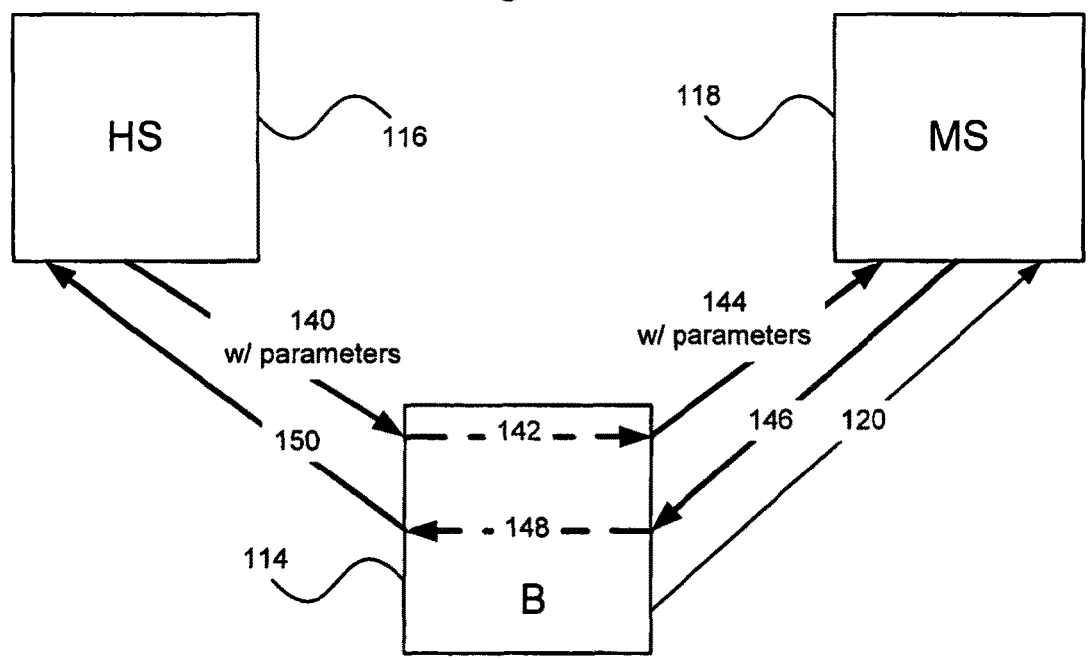
FIG. 6 is a block diagram illustrating a secure login in a system of the present invention.

FIG. 6 illustrates a further security level for use in the present invention. The user of browser 114 visits MS 118, and, upon indicating a membership in the identity management network, is redirected to HS 116 along the virtual channel created by datapaths 146, 148 and 150. After authenticating the user, HS 116 transmits the response to the information and/or authentication request to MS 118 over secure the virtual channel created by datapaths 140 142 and 144 along with the request parameters. To provide enhanced data protection, MS 118 uses secure paths 146 and 150 to transmit the request to HS 116 and also signs the request. HS 116 can then verify that the request was signed by MS 118, and has not been tampered with during transmission. If a request has been tampered with, HS 116 can redirect B 114 to MS 118 without the requested information to provide a message that the request was modified prior to receipt. If HS 116 and MS 118 have no other connection to each other, other than belonging to the same identity management network, MS 116 can provide its public key to HS 116 along with the request. To ensure that the signature is not modified, or replaced, during an attack, the signature can be signed by a common trusted party, such as a network root or a trusted certificate authority.

To offer the different gradients of channel security, the present invention provides for both membersites and homesites to communicate to each other, preferably through browser 114, using a channel selected from a channel listing. The following listing is meant to be exemplary and is not necessarily exhaustive. The list is not strictly ordered to show increasing security, as certain features of some channels offer security in a different manner than others. At a first level an open channel, with no encryption, can be used between the MS and the HS. To increase the security, and open channel can be used with HS signing the response to show that the content has not been modified in transit. A secure channel can be used, so that transit between the HS and B, and B and MS is secure. A secure channel with a signed response allows HS to have a secure connection to B, and then have a secure channel from B to MS, and allows MS to see that the response has not been modified in transit. An open channel can be used, with both the request and the response signed. This allows HS to know that the request for information has not been tampered with, and allows the MS to know that the response has not been tampered with. If HS passes the signed request back to MS along with the signed response, MS can also verify that the request was not tampered with. The same signed request and response can also be transmitted over a secure channel.

By offering a series of these security levels the identity management system of the present invention allows membersites to use the most appropriate security for their needs, and does not force a one size fits all solution upon membersites. Homesites include input ports to receive requests for information and authentication. Prior to release of the information or authentication, a homesite can examine the information to be released and compare it to specified user conditions for the release of that information. Thus, a user can specify a channel security level at which information can be released, similar to the authentication security level settings on information described above. This allows a membersite to make a low security request, and a user preference or homesite policy to override it, and inform the membersite that the requested information can only be released using secure channels. The use of redirect commands allows the HS and MS to pass these messages to each other transparently to the user. Thus, the homesite input ports receive membersite requests, while an authentication engine obtains user authentication, and optionally obtains user authorization for the release of requested information. A homesite response engine then prepares the response to the received request and transmits it to the membersite over either the requested channel, or over a channel required by user preferences or homesite policies.

MS 118 is always guaranteed that the message from HS 116 has not been modified when a signed response is sent. The signature can be verified against a signature signed by a trusted third party, such as a network root as described in other references, or by a certificate authority.

Figure 7:
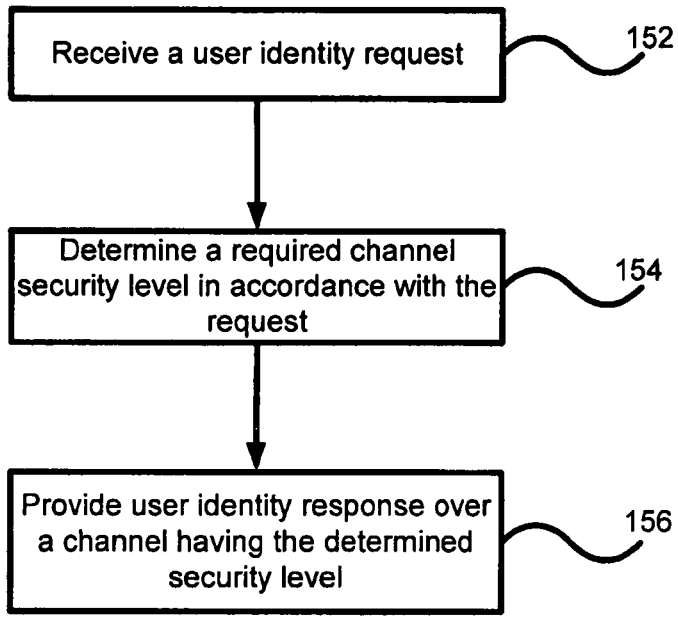
FIG. 7 is a flowchart illustrating a method of the present invention.

FIG. 7 illustrates an exemplary method for a homesite to select a channel as described above. In step 152, a homesite receives a user identity request. In step 154, the homesite determines a required channel security level in accordance with the request. As described above the channel can be selected from a list defined a priori. In step 156, the homesite provides a user identity response over a channel having the appropriate security level. As one skilled in the art will appreciate, the determination of a required channel can be done in accordance with both the request and user or homesite defined preferences. As described above, if a membersite requests information over a channel deemed unacceptably low by either homesite or user defined preferences, the homesite can attempt to force the membersite to use a higher security channel by redirecting the user to the membersite with a response that indicates that a more secure channel is required. This response can either simply indicate that a more secure channel is required or it can indicate the minimum channel required.

Figure 8:
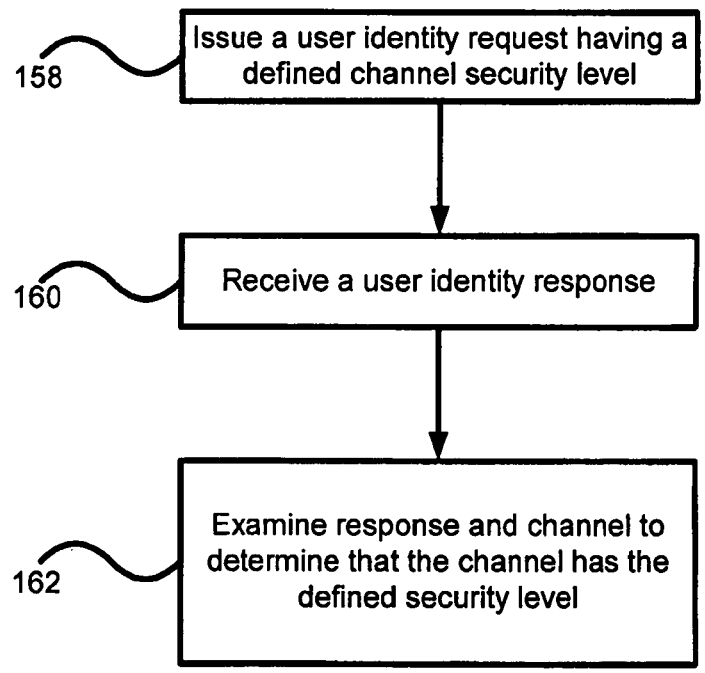
FIG. 8 is a flowchart illustrating a method of the present invention.

FIG. 8 illustrates an exemplary method for a membersite to specify a channel as described above. The membersite, in step 158, issues a user identity request, which includes a defined channel security level. As described above the channel security level can be selected from a list defined a priori. In response to the user identity request, the membersite receives, in step 160, a user identity response. In step 162, the membersite can examine both the response and the channel, over which the response was received, to determine that the channel has the defined security level. If the membersite requested that the response include a signed set of the request parameters over an unencrypted http channel, an inspection of both the channel and the response will indicate whether or not the response meets the requirements. If the response does not meet the requirements, the user can be informed that the homesite did not respond as expected and that an attack may be in progress on the user's identity. In the alternate the membersite could determine that it is under attack from a malicious third party, and determine that the safest course of action is to terminate the connection and log the IP address of the response sender, which, if the browser was used to redirect the response, should correspond to the user.

One skilled in the art will appreciate that the above described channel and authentication security levels can be provided either separately from each other or in tandem. They both rely upon a membersite issuing a user identity request with a defined security level, and the membersite receiving a response that is checked to ensure that it meets the defined security level. From the perspective of the homesite, both methods involve receiving user identity requests, determining a security level in accordance with the received request and sending a response that meets the specified security levels.

One skilled in the art will appreciate that the various systems of the present invention can be implemented using standard computing hardware controlled by software to receive information, analyze it and provide a response appropriate to the method of the present invention. Applicant notes that the homesite of the present invention preferably includes an input, and authentication engine and a response engine. The input receives membersite request, preferably via the user, the authentication engine determines the requested authentication and authenticates the user, while the response engine sends an appropriate reply to the membersite. A membersite of the present invention can include an input for receiving a user, an authentication request engine, for transmitting a user authentication request with specified a security level, and a response analyzer for analyzing the response to the authentication request to ensure that the security level of the response either matches or exceeds the specified security level.

Figure 9:
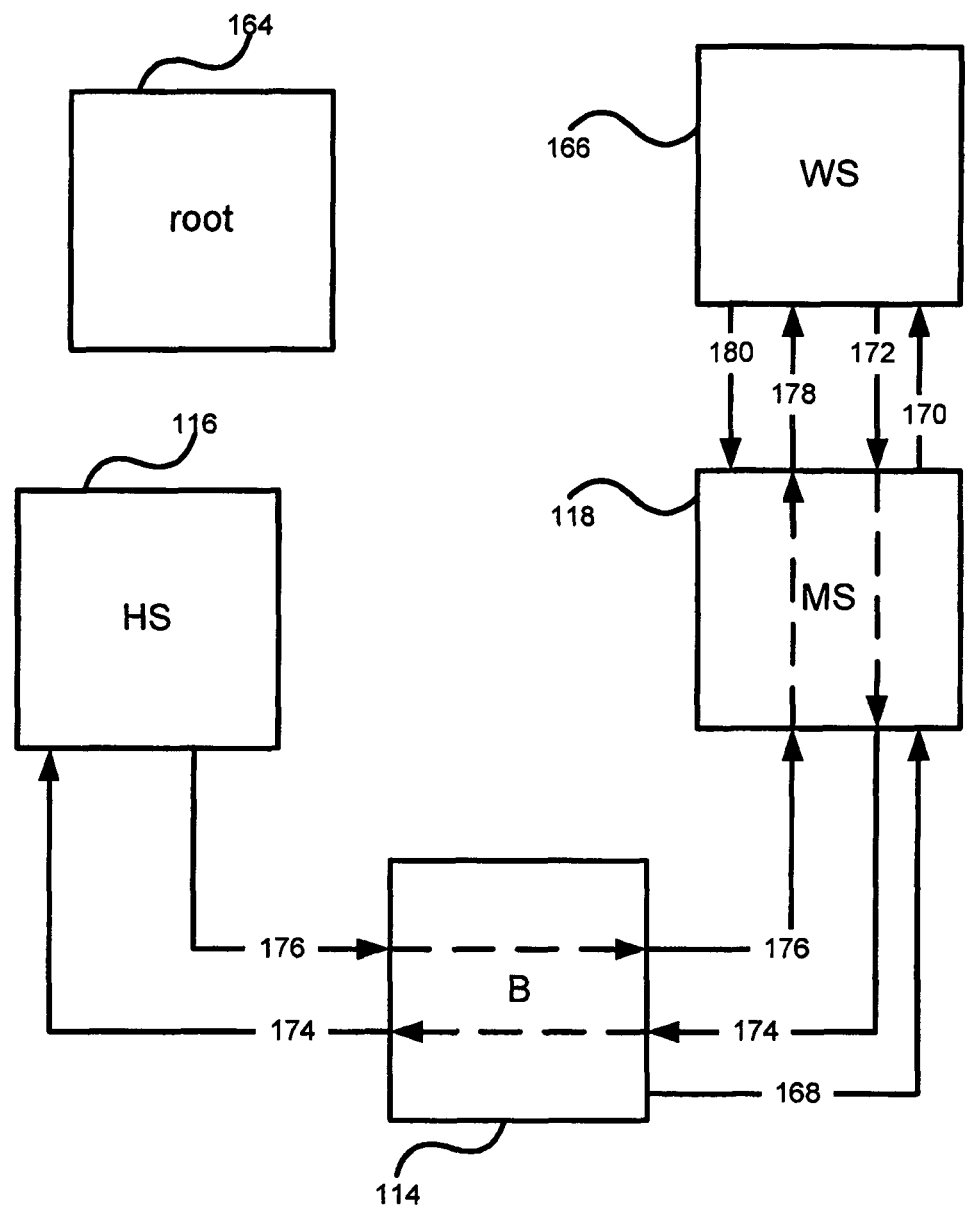
FIG. 9 is a block diagram illustrating the dataflow for providing authorization and authentication to a webservice provider.

FIG. 9 illustrates the application of the security system described above to allow a membersite to connect to a webservice on behalf of a user to obtain information or to have service performed. In FIG. 9, HS 116, MS 118 and webservice WS 166 all belong to the identity management network operated by root 164. In belonging to the network, each node has trust in root 164, and can identify other nodes in the network by requesting a signature, associated with the other nodes, that is signed by the root. By offering another node in the network a public signature block that is signed by the root, a node can establish both that it is part of the network, and that any transmission that it makes has not been tampered with.

When the user of browser 114 establishes a session with MS 118, over connection 168, an authentication with HS 116 takes place (not shown as part of the data flow). After authentication, the user may request a feature provided by MS 118 that requires access to a webservice, such as WS 166. As an illustrative example, not intended to limit the scope of the invention, MS 118 may offer a financial portal service to the user of browser 114, whereby MS 118 collects financial information from a number of other servers and presents it to the user in a consolidated format. WS 166 can match a globally unique persona identifier (GUPI) with the user of browser 114 and the services to which the user is subscribed. MS 118 provides a request to WS 166 over datapath 170. WS 166 sends a request 172 to MS 118. This request typically includes a request for user authentication and a set of information to allow WS 166 to identify the user. The request from WS 166 can also include requests for assertions from third parties that are held by the homesite 116. Such assertions can include verifiable statements that a user is a member of an organization, such as a reward program, and even that the user has obtained a status level in the organization. Other assertions may be issued by governmental organizations indicating that a user has a geographical location. Those skilled in the art will appreciate that any number of third party assertions can be provided to WS 166. This request is preferably accompanied with a nonce or other form of session identifier so that MS 118, or another system, is prevented from using the user authentication as part of a replay attack. MS 118 forwards the request for authentication to HS 116 by redirecting the user along logical datapath 174, one skilled in the art will appreciate that datapath 174 can include multiple channels established between different nodes on a point-to-point basis. The request from MS 118 to HS 116 may simply be the WS 166 request, or it may include a series of requests, including an aggregation of requests from the number of other web services (not shown). Furthermore, the request sent along datapath 174 may include other information needed by MS 118. The request relayed to HS 116 preferably contains a request for a set of information about the user, user authentication, and an explanation of what information is being provided and why it is being requested. In a presently preferred embodiment, the explanation is provided both as plaintext so that HS 116 can easily display it to the user, and as a programmatic explanation, so that HS 116 can obtain one-time authorization for the release of the information to WS 166. The programmatic explanation, if provided, allows HS 116 to simply perform a compare operation on existing authorizations, reducing the number of times that the user must interact with HS 116, increasing the appearance of a seamless experience.

Upon obtaining user authorization and authentication, HS 116 prepares a response, signs the response and includes its public signature, signed by root 164. If the request from MS 118 is an aggregation of requests from multiple webservices, HS 116 can sign each corresponding response separately so that each webservice is provided with only the information that it requested. In an alternate embodiment, to reduce the computational overhead on HS 116 imposed by signing multiple data blocks, the entire response is signed, and each web service is provided the whole response. The response is sent to MS 118 via browser 114 over datapath 176. MS 118 preferably breaks the response into the separately signed segments and forwards each segment to the respective WS. WS 166 then receives its request on datapath 178. WS 166 can then authenticate that the data has not been modified in transit by examining the homesite signature and knowing the root signature. The use of a nonce, as described above, provides WS 166 the ability to track when the request was issued if a timeout value is to be applied. WS 166 can match information in the response from HS 116 to information held, such as bank account information, to determine which information to release to MS 118. Upon validating the authorization and gathering the information to release to MS 118, WS 166 sends the information to MS 118 over datapath 180. Upon receipt of the information from WS 166, MS 118 can act on the information as required. Depending on the content of the response, WS 166 may select the elements of the signed response that it needs and then examine the authorization it has received. If authorization has been received WS 166 will either provide a token to MS 118 that permits multiple access without further authentication, or will provide the requested information to MS 118 without a token to provide one-time access only. For the purposes of an example, not intended to limit the scope of the present invention, the following scenario is presented. A user directs browser 114 to MS 118, where a session has already been established. MS 118 provides the ability to aggregate information, such as travel information, for a user. MS 118 has knowledge of the user's upcoming travel itinerary, and proceeds to connect to an airline travel webservice, WS 166. WS 166 upon receiving the initial contact from MS 118 provides a request for authentication of the user, using datapath 172, and requests the user's full name, address and frequent flier information. This request is forwarded to HS 116, possibly along with other information requests, following datapath 174 through MS 118, and browser 114. Upon receipt of the request, HS 116 requests that the user re-authenticate. The request from WS 166 is accompanied by both a text explanation outlining the information that is going to be released and a programmatic explanation; so that at a later date the user does not need to interact with HS 116, and HS 116 can simply send the response. After authentication and acceptance of the release of the information, the user authorizes HS 116 to release the information to WS 166. HS 116 then prepares a response including a user identifier, such as a GUPI, the requested information, and a nonce provided with request. The response is signed by HS 116, and a root-signed copy of HS 116's public signature is appended to the signed response. This response is forwarded to MS 118 via browser 114 by redirecting the browser, along the continuation of datapath 176, using any of a number of known techniques. MS 118 then forwards the segment of the signed response corresponding to the request from WS 166 to WS 166 over datapath 178. After verifying the nonce and the requested information, WS 166 obtains the flight information for the user, provides it to MS 118, and allows any of a number of functions to be provided including seat selection and advance check-in with electronic boarding pass provisions. One skilled in the art will appreciate both that other services can be provided, and that MS 118 can connect to a plurality of webservices to aggregate data from each of them. In one embodiment of the present invention, MS 118 requests sessions with a plurality of webservice providers, and aggregates their information requests. The aggregated requests are then provided en masse to HS 116, and user authorization for all requests is obtained at once. This allows HS 116 to provide a series of responses to MS 118, at which time MS 118 then separates the responses and sends each of the individual responses to the respective webservice providers. The severing of the concatenated responses from HS 116 can easily be managed using the session identifiers issued by each webservice provider as a key. In alternate embodiments, HS 116 obtains user approval for the release of the information to each of the webservice providers, and then sends the responses one at a time to MS 118, which after receiving a response simply redirects browser 114 to HS 116 to obtain the next response until all responses are obtained and forwarded to the webservice providers. One skilled in the art will appreciate that the actual mechanism used for the supporting of multiple webservice providers can vary without affecting the scope of the present invention.

Webservice providers, such as WS 166, can relate the information that they requested to their database, and at the same time be assured that they are allowed to release the information, as HS 116 can be proven to be authoritative for the user's identifier by following a signature key chain through any number of delegations until a trusted source is used to show that HS 116 is authoritative for the information released.

Some of the information housed by HS 116 may be provided to it by an outside authoritative source as described in detail in related applications, such as Canadian Application Numbers 2,468,351, and 2,468,585, which are hereby incorporated by reference. In cases where the information, such as a frequent flier number, is housed by an external authoritative site, HS 116 can provide the externally signed assertion to WS 166, allowing WS 166 to determine both that the information provided is authentic, and that HS 116 is authoritative for the user associated with the information.

One skilled in the art will appreciate that MS 118 may always connect to WS 166. As a result, MS 118 can, upon receiving an indication that the user is part of the identity management system, initiate the connection to WS 166 to request a session over datapath 170. When MS 118 requests information required by WS 166, it can include its own user authentication request. Thus, authentication of the user at HS 116 can be done at the same time that the user authorizes the release of information to WS 166.

Figure 10:
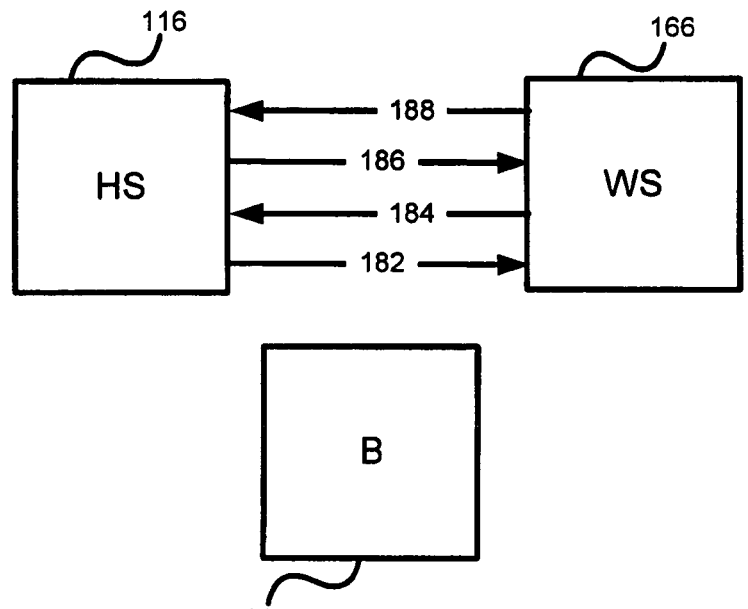
FIG. 10 is a block diagram illustrating an additional dataflow for authorization of a webservice provider.

As illustrated in FIG. 10, HS 116 is authoritative for the user of browser 114. As such, HS 116 can be used as an agent of the user and permitted to directly interact with WS 166. In such a scenario HS 116 directly connects to WS 166, and requests information using connection 182. WS 166 uses a standard interface, and as a result does not notice a difference between HS 116 and MS 118. Because HS 116 is already authoritative for the user, the authentication and data passing through MS 118 can be bypassed. WS 166 can issue an authentication request 184, which HS 116, acting as an agent for the user, can directly respond to over connection 186. WS 166 can then either issue a token or one-time-information 188. The user's trust of HS 116 allows for this scenario to be permitted, as without user approval HS 116 will not interact with WS 166.

Figure 11:
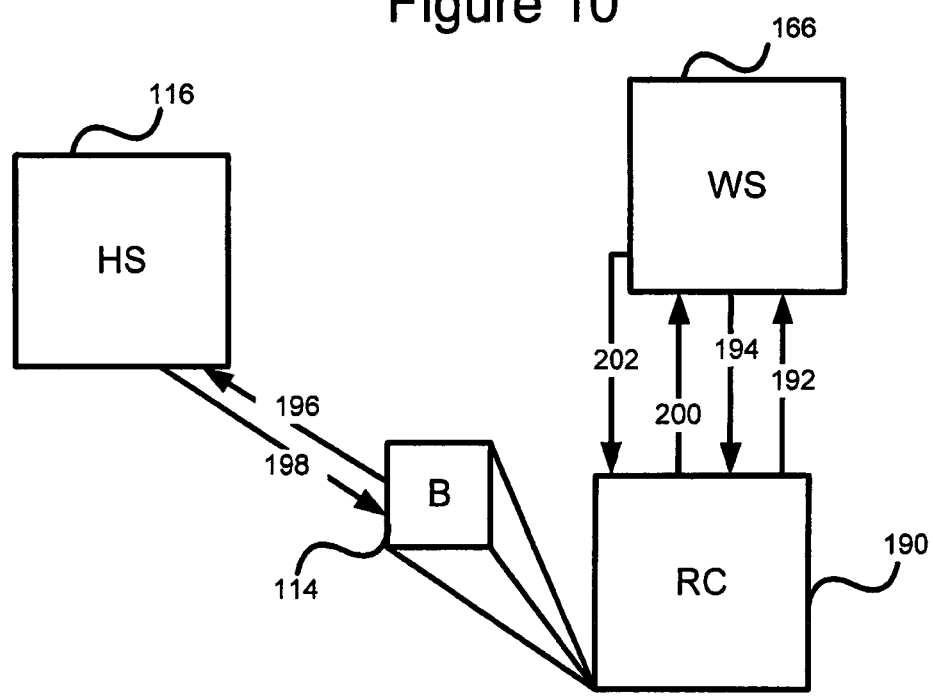
FIG. 11 is a block diagram illustrating a rich client interfacing with a homesite and a webservice provider.

A rich client can be provided that interacts with WS 166 on the user's behalf without having to interact with MS 118, as illustrated in FIG. 11. As an example, if WS 166 provides financial information to users for a bank, the bank can provide users with a rich client (RC) 190 that will interact with WS120. The client is preferably a non-browser based application that can make calls to WS 166. Due to its standardized interface, WS 166 is agnostic as to who interacts with it. RC 190 appears as another MS to WS 166. When RC 190 issues a request 192 to WS 166, it receives a request for authentication and information 194. RC then launches a browser 114 from the local computer, and uses the browser 114 to transmit WS 166's request to HS 116 over datapath 196. The user interacts with HS 116 in the normal manner, and approves the release of the information. The response 198 is sent from HS 116 to the browser 114, which provides the information to RC 190. RC 190 can then close the browser window, and forward the requested information to WS 166 over datapath 200. RC 190 can obtain the requested information from the browser 114 prior to closing the window, by having the browser 114 redirected to the localhost address at a predetermined port. As long as RC 190 has control over that port and is listening on it, the information can be received and then sent along to WS 166. WS 166 can then send the requested information, or a token, to RC 190 over datapath 202.

To facilitate the interaction of RC with the rest of the network, RC can use a public API to interact with network nodes such as HS 116 and WS 166. As new standards for connection are defined, or new node types arise, the API can be changed by a public administrator, and then provided to the users of RC. By replacing the API, the ability to connect either to new node types or to existing nodes in a new manner can be provided without requiring the rewriting of the code base for RC.

Figure 12:
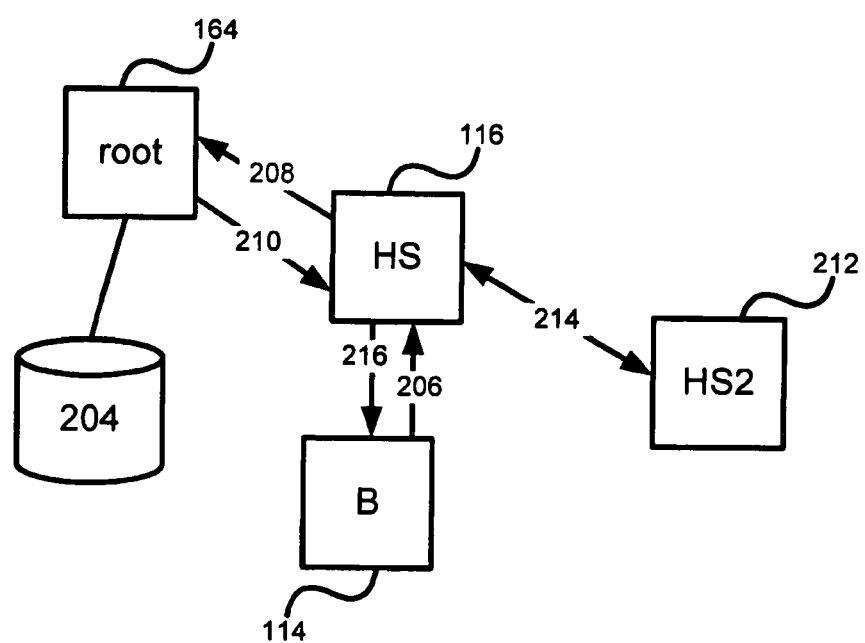
FIG. 12 is a block diagram illustrating a distributed contact management system of the present invention.

As described above, the network root administers admission to the network, and provides signed assertions that a homesite is authoritative for a user. Each user is uniquely identified by both a GUPI and an email address. By leveraging the trust model of this network, a distributed contact management network is provided. At present contact management networks require a single database of contacts that are maintained by a sole provider. The distributed nature of the network of the present invention bypasses the drawbacks to that model. A distributed contact management system in the network of the present invention is illustrated in FIG. 12.

Root 164 maintains a database 204 mapping email addresses to associated GUPI's and homesite identifiers used to identify the homesite that is authoritative for the GUPI. HS 116 is authoritative for a GUPI associated with the user of browser 114. The user of browser 114 provides to HS 116 a listing of known contacts over datapath 206. HS 116 extracts the email addresses from the contact listing and provides the email addresses to root 164 over datapath 208. Root 164 then identifies the GUPI and homesite associated with each submitted email address, and provides this information to the HS 116 over return datapath 210. HS 116 can then contact HS2 212, which is authoritative for a GUPI associated with one of the submitted email addresses over connection 214. When HS 116 contacts HS2 212 over datapath 214, it can request additional contact information stored by HS2 212. HS2 212 can release this information, if authorized by the relevant user, or can ask the relevant user for authorization at the next login. When providing the information, HS2 212 can provide a URI to HS 116 allowing HS 116 to obtain updated information at other times, so that the contact information can be updated periodically. Conversely, HS 116 can provide HS2 212 with a URI so that when the requested information changes, or at fixed intervals, HS 116 will receive updated information over datapath 214. After receiving the user information over datapath 214, HS 116 can forward the information to browser 114 over datapath 216. One skilled in the art will appreciate that a number of other software applications, other than a standard internet web browser, can be used by the user to communicate with HS 116 including email and contact management clients. In the above scenario the contact information can be transmitted in any of a number of formats including the virtual card (vcard) standard.

Figure 13:
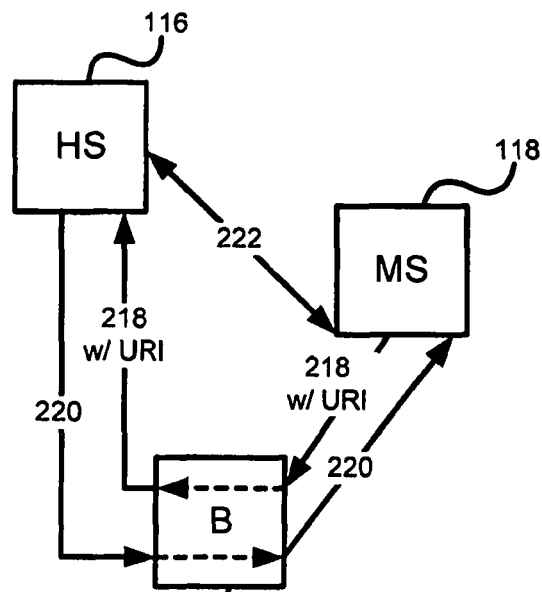
FIG. 13 is a block diagram illustrating an automated user information distribution system of the present invention.

The above-described scenario allows homesites to communicate to each other using URI's to update information. A similar network service is illustrated in FIG. 13, where HS 116 is provided with an update URI by MS 118, through browser 114 during a request for information over datapath 218. The requested information is provided to MS 118 over datapath 220. Both channels 218 and 220 make use of the redirection of browser 114. However, when the supplied information changes, and if the user has approved the updating of information, HS 116 can create a back channel connection 222 to MS 118 to supply the updated information. One skilled in the art will appreciate that in addition to the request interface described above, a homesite would preferably have an update interface or engine, to allow monitoring of information for a user, so that when a user modifies a profile, the relevant information can be updated by backchannel, without requiring user interaction with the membersite.

Figure 14:
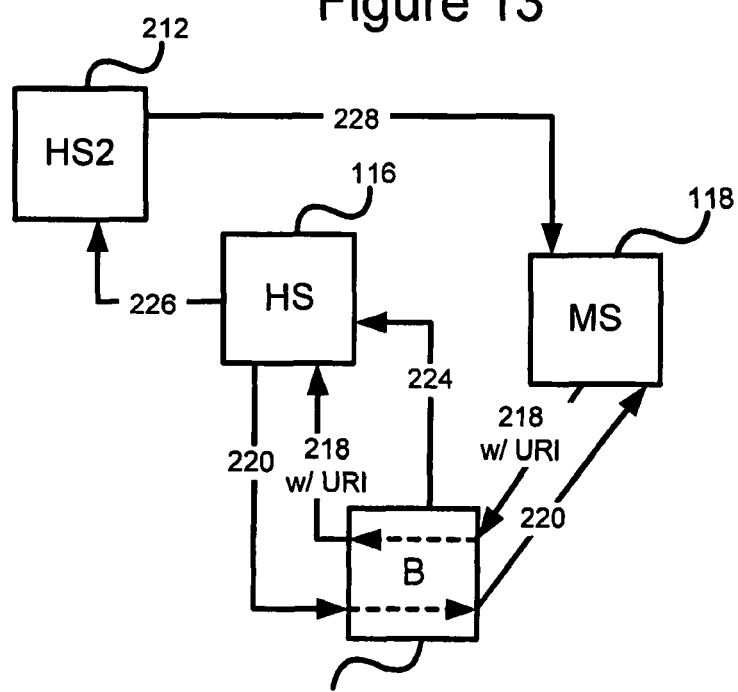
FIG. 14 is a block diagram illustrating a further embodiment of the automated user information distribution system illustrated in FIG. 13.

FIG. 14 illustrates the use of the update URI for a user who is changing from HS 116 to HS2 212 as a principal identity store. As in the example of FIG. 13, HS 116 has obtained an update URI associated with MS 118 over datapath 218, and has provided contact information to MS 118 over data path 220. The user, through browser 114 over datapath 224, informs HS 116 that the GUPI, and all associated information, is to be transferred to HS2 212. This can be a permanent transfer of information, or it can be using one homesite to serve as a backup to another. HS 116 connects to HS2 212, either directly over a back channel, or through redirection of the browser 114, and an exchange of data is made. This datapath is shown as datapath 226, which is an example of a back channel connection, but one skilled in the art will appreciate that it can be performed using browser redirection. Along with the user information associated with the GUPI, HS 116 transfers the update URI from MS 118 to HS2 212. Thus, when HS2 212 receives updated information from browser 114 the information can still be updated with MS 118 seamlessly over datapath 228.

GUPI's are typically assigned by root 164 to a homesite, such as HS 116. Thus far in identity management systems, each identifier is linked to an email address. This removes the ability of a user to be anonymous, as the identifier can be associated with an email address that is easily traceable to a user. To satisfy the need for anonymous personas, root 164 can assign a series of GUPIs to HS 116 as an anonymous pool. This allows HS 116 to provide a user with a pool of anonymous GUPIs, so that if a user wishes to remain anonymous, HS 116 is the only site that can identify the user. Once again, this model is predicated upon the user of browser 114 having trust in HS 116, without which, HS 116 would never be able to server as a homesite that stores the user's identity information. With a sufficiently large pool of anonymous GUPIs, HS 116 can assign a different GUPI to each site that a user visits. Though this prevents the building of attributes that can establish a virtual reputation, the purpose of anonymous personas is to prevent the building of any reputation. Because no two sites will be given the same GUPI, the result is much the same as a pairwise unique identifier, however, HS 116 can, in one embodiment, economize on GUPI's in the unique pool by allowing the same GUPI to be used by two different users at two different sites. Because the GUPI has no attributes associated with it, and no user can build a reputation with it, if treated communally it further anonymizes the behaviour of the user. In non-shared embodiments, HS 116 must track the pairings of the membersite identifier and the user to determine the GUPI to be used. If the GUPI is not shared, it is still globally unique, and can be ported to another homesite. When transferring persona information to another homesite, the user can obtain a GUPI list from the homesite and can have the authoritativeness of that GUPI transferred to another homesite. For the embodiment where GUPIs are communally shared, the new homesite can be made authoritative for the GUPI, maintaining the same membersite identifier and user pairing to associate to the GUPI, without revoking the authoritativeness of the original homesite, as other people at other sites may use the GUPI.

One of the issues that arise from using multiple GUPI to allow a user to keep persona separate, is that when assertions are made, they are typically made for a single persona. Thus, for a user with home and office persona, an assertion may be made for the office persona regarding membership in an organization. If the user's home persona needs to make use of the membership assertion attached to the office persona there are two mechanisms provided by the present invention for this. Using a first mechanism, a user can direct HS 116 to contact AS which issued the assertion for the work persona. HS 116 then provides AS with multiple GUPIs, and the assertions for any of the provided GUPIs issued by AS and indicates that it is authoritative for all the submitted GUPIs, and all the submitted GUPIs are the same individual. AS, upon being informed that all the GUPIs are issued to the same individual, can then provide any GUPIs that do not have an assertion, with the assertion provided by HS 116. In an example, AS is a frequent flier program, and has provided an assertion indicating that the office persona of a user has obtained elite status. HS 116 provides the GUPIs for the user's office and home persona to AS along with the assertion that the office persona has obtained elite status. AS then verifies that HS 116 is authoritative for both GUPIs, and confirms that the office persona is certified as having elite status. AS then provides an assertion for the GUPI associated with the home persona indicating elite status. This allows for assertions to be shared between persona, but comes at the cost of having AS know that two GUPI are related to each other.

If a user wishes to avoid having two GUPI linked together by an AS, but one GUPI has an assertion needed by the other GUPI, the following method can be employed. When MS 118 requests an assertion about a first GUPI that is only held by a second GUPI, HS 116 can include in its signed response, both GUPIs, and the assertion held for the second GUPI. MS 118 can then determine from the response, that HS 116 is authoritative for both GUPIs, and sees that HS 116 states that both GUPIs are issued to the same person. MS 118 can then verify that the second persona has the required assertion, and apply the assertion to the first persona. As an example, a user with office and home persona has an assertion for the office persona that indicates elite status in a frequent flier program from AS. The user wants to use this assertion with the home persona when visiting MS 118. In response to MS 118's request for the assertion, HS 116 sends both office and home GUPI, and the assertion for the office persona GUPI. MS 116 can then verify that the GUPIs are related, and can transitively apply the assertion to the home persona. In contrast to the first embodiment, AS does not know that the persona are linked, but MS 118 knows. Because the operation, by default, includes moving attributes from one persona to another, HS 116 must reveal the link between 2 GUPIs to at least one of the two. By offering both mechanisms, the user is provided the opportunity to choose which node in the network is shown the link.

The above described method and system for sharing credentials between GUPIs can also be used in relation to anonymous GUPI, though it should be noted that this reduces the anonymity of a GUPI, so should preferably not be done with a GUPI shared among users. For a MS 118 that has only ever been presented with an anonymous GUPI, the above-described method provides a method of transferring history to an identifiable GUPI. If HS 116 provides MS 118 with both an anonymous GUPI and an identifiable, or non-anonymous, GUPI, MS 118 can transfer any history associated with the anonymous GUPI to the identifiable GUPI. This allows a user to interact with MS 118 in an anonymous fashion, and then, having reached a comfort level with MS 118, the user can present another GUPI and have any history and reputation transferred to the non-anonymous GUPI.

To increase the availability of homesite management capabilities, a homesite can be built-in to a browser. Such a homesite can be offered either as an integral part of a web browser, or can be offered using a plug-in architecture. Such a plug in, or integrated browser, can be used to simplify the communication with nodes in the network and reduce the redirection of previous embodiments.

At a first level, a browser can indicate that it understands extensions to HTML specific to the identity management network. When browsers make requests from web servers using the hypertext transfer protocol (http), they provide an indication of capabilities, including an HTML version. By indicating that the browser understands the identity management network extensions to HTML (or identity management HTML tags), MS 118 does not need to redirect the browser to the shadow domain to find out the homesite of the user. Instead, MS can simply send an HTML instruction to the browser to obtain user authentication. If the browser indicates that it is both identity management aware, and that a homesite has been configured, MS 118 need only provide authentication and information requests to the browser, and the browser will then handle any redirection needed. This allows MS 118 to avoid using redirections to shadow domains to find out what the user's homesite is, and avoids having to issue redirection requests to the browser. From the perspective of the user, fewer redirection requests are issued, and MS 118 never obtains the location of the users' homesite. If MS 118 simply instructs the enhanced browser to obtain authentication in an HTML tagged message, it does not need to tell the browser where to redirect to, and avoids using Javascript™ redirects and close window commands to make the user experience seamless. The MS only determines the user's HS, when a response is issued, which increases user privacy.

As an enhancement, an enhanced browser can also be provided with the ability to function as a homesite. As disclosed in the above-cited references, a homesite can be provided as a local application. By integrating the homesite within the web browser, redirection can be avoided. When the HS-enabled browser visits MS 118, it indicates that it supports identity management HTML tags. MS 118 then instructs the browser to obtain user authentication and return user information. HS-enabled browser no longer needs to redirect to an external site, and instead can provide user authentication using a locally controlled authentication tab or window. If the user his specified that use of the browser is a sufficient indication of authentication, HS-enabled browser can immediately return the requested information, having signed the response. This eliminates the user having to interact with an external homesite, and reduces the data transmission, which is especially important on low-bandwidth connections. The HS-enabled browser preferably does not have a homesite cookie, so that MS 118 will not know that the user is using a local homesite.

One skilled in the art will appreciate that when an identity management aware browser sends identity management information through http headers, it allows MS 118 to refrain from bouncing the browser to the shadow domain. This allows MS 118 to simplify its interaction with the browser, as the browser has indicated that it knows a homesite for the user. Instead of the MS being sent the HS identifying information, MS uses an http command to request authentication in a POST command. The browser will handle redirection if needed and will replace the request authentication command with the appropriate HTML if an external HS is used. If an external HS is used, it can identify that it does not need to use a redirect command to send the information to MS, and instead simply sends the response to the browser and tells the browser to send the information to the MS.

The above-described enhancement to a browser can either be integrated into the browser code, or can be provided as a plug in. One skilled in the art will appreciate that either embodiment can communicate with a root node to obtain updated schema, or can obtain the updated schema from a central service used to ensure that the browser has been updated to the most recent patches and bug-fixes.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A computer-readable storage device storing instructions that, when executed by a computing system, cause the computing system to perform acts for verifying response security, the acts comprising:
sending to a first computing system, via a first data path, a first request for information, the first request including a first transaction security level for responding to the first request for information;
receiving from the first computing system, a first response to the first request, wherein the first response is transmitted by the first computing system in accordance with a response security level determined by the first computing system based on the first transaction security level included in the first request, and wherein the first response is transmitted over a channel selected by the first computing system from a list of channels based at least in part on the first transaction security level;
verifying that the first response was sent using a first response security level at or above on the first transaction security level;
verifying that the first response was sent over a channel with a channel security level in accordance with the first transaction security level;
sending to a second computing system, via a second data path different from the first data path, a second request for information, the second request including a second transaction security level for responding to the second request for information;

receiving from the second computing system, a second response corresponding to the second request;

determining by at least one hardware processor that the second response does not meet minimum requirements associated with the second transaction security level; and responsive to the determining that the second response does not meet the minimum requirements, providing an indication that an attack may be in progress.

2. The computer-readable storage device of claim 1, wherein the acts further comprise terminating a connection with the second computing system, responsive to the determination that the second response does not meet minimum requirements.

3. The computer-readable storage device of claim 1, wherein the acts further comprise providing an indication to a user that the second computing system did not respond as expected, responsive to the determination that the second response does not meet minimum requirements.

4. The computer-readable storage device of claim 1, wherein the acts further comprise logging an IP address of the second computing system, responsive to the determination that the second response does not meet minimum requirements.

5. The computer-readable storage device of claim 1:
wherein the second transaction security level comprises a transaction authentication security level; and
wherein the determining that the second response does not meet minimum requirements associated with the transaction authentication security level comprises determining that an authentication mechanism that was selected to transmit the second response does not have an authentication security level corresponding to the transaction authentication security level.

6. The computer-readable storage device of claim 1:
wherein the second transaction security level comprises a transaction channel security level; and
wherein the determining that the second response does not meet minimum requirements associated with the transaction channel security level comprises determining that a channel that was selected to transmit the second response does not have a channel security level corresponding to the transaction channel security level.

7. The computer-readable storage device of claim 1:
wherein the second transaction security level comprises a transaction time sensitivity security level; and
wherein the determining that the second response does not meet minimum requirements associated with the transaction time sensitivity security level comprises determining that the second response was not received within a specified time limit corresponding to the transaction time sensitivity security level.

8. The computer-readable storage device of claim 1, wherein the second response comprises an attempt to provide an authentication of a user identity.

9. The computer-readable storage device of claim 1, wherein the second transaction security level is selected based on a previous communication with the second computing system.

10. The computer-readable storage device of claim 1, wherein the second transaction security level is selected based on user preferences.

11. The computer-readable storage device of claim 10, wherein the user preferences are associated with the information requested in the received second request.

12. A system for analyzing security characteristics of responses, the system comprising:
a memory;
one or more processors;
an interface configured to:
receive, from a first computing system, a first response to a first request for user information,
wherein the first request includes a request for user authentication at a first transaction security level, the first request sent via a first data path,
wherein the first transaction security level is based on a type of the user information requested in the first request,
wherein the first response is transmitted by the first computing system in accordance with a response security level determined by the first computing system based on the first transaction security level indicated by the first request and the user information requested in the first request; and
receive, from a second computing system, a second response to a second request for information, wherein the second request includes a request for user authentication at a second transaction security level, the second request sent via a second data path different from the first data path, wherein the second transaction security level is based on a type of the information requested in the second request; and
a security analysis module configured to:
verify that the first response was sent using a first response security level at or above the first transaction security level included in the first request;
determine that the second response was sent using a second response security level that does not meet minimum requirements associated with the second transaction security level; and
provide an indication that an attack may be in progress from the second computing system, responsive to the determination that the second response security level does not meet the minimum requirements.

13. The system of claim 11 wherein the security analysis module is further configured to, responsive to the indication that the attack may be in progress, terminate a connection with the second computing system or log an IP address of the second computing system.

14. The system of claim 11, wherein the second transaction security level is selected based on a previous communication with the second computing system.

15. A method for verifying response security, comprising:
sending to a computing system, a request for information, the request including a request for user authentication at a transaction security level and a request for user information;
receiving from the computing system, via a selected data path, a response corresponding to the request, wherein the response is transmitted over a channel selected by the computing system from a list of channels based at least on the transaction security level, a type of information requested in the user request, or both;
determining by at least one hardware processor that an attack may be in progress when either the response was sent using a response security level that does not meet minimum requirements associated with the transaction security level, or the response was transmitted over a channel with a channel security level that does not meet minimum requirements associated with the transaction security level; and responsive to the determining that the response does not meet the minimum requirements, providing an indication that an attack may be in progress.

16. The method of claim 15 further comprising, responsive to the determination that the response does not meet minimum requirements, terminating a connection with the computing system.

17. The method of claim 15 further comprising, responsive to the determination that the response does not meet minimum requirements, logging an IP address of the computing system.

18. The method of claim 15:
wherein the transaction security level comprises a transaction authentication security level; and
wherein the determining that the response does not meet minimum requirements associated with the transaction authentication security level comprises determining that an authentication mechanism that was selected to transmit the response does not have an authentication security level corresponding to the transaction authentication security level.

19. The method of claim 15:
wherein the transaction security level comprises a transaction channel security level; and
wherein the determining that the response does not meet minimum requirements associated with the transaction channel security level comprises determining that a channel that was selected to transmit the response does not have a channel security level corresponding to the transaction channel security level.

20. The method of claim 15:
wherein the transaction security level comprises a transaction time sensitivity security level; and
wherein the determining that the response does not meet minimum requirements associated with the transaction time sensitivity security level comprises determining that the response was not received within a specified time limit corresponding to the transaction time sensitivity security level.

* * * * *